(12) United States Patent
Gebald et al.

(10) Patent No.: US 11,420,149 B2
(45) Date of Patent: Aug. 23, 2022

(54) EFFICIENT METHOD AND DEVICE FOR ADSORPTION/DESORPTION OF CARBON DIOXIDE FROM GAS STREAMS

(71) Applicant: CLIMEWORKS AG, Zurich (CH)

(72) Inventors: Christoph Gebald, Zurich (CH); Nicolas Repond, Zurich (CH); Jan André Wurzbacher, Zurich (CH); Anca Elena Timofte, Zurich (CH); Istvan Meszaros, Zurich (CH); Benjamin Keusch, Zurich (CH)

(73) Assignee: CLIMEWORKS AG, Zurich (CH)

( * ) Notice: Subject to any disclaimer, the term of this patent is extended or adjusted under 35 U.S.C. 154(b) by 100 days.

(21) Appl. No.: 17/054,239

(22) PCT Filed: Jun. 5, 2019

(86) PCT No.: PCT/EP2019/064609
§ 371 (c)(1),
(2) Date: Nov. 10, 2020

(87) PCT Pub. No.: WO2019/238488
PCT Pub. Date: Dec. 19, 2019

(65) Prior Publication Data
US 2021/0187434 A1  Jun. 24, 2021

(30) Foreign Application Priority Data
Jun. 14, 2018  (EP) ..................... 18177796

(51) Int. Cl.
*B01D 53/00* (2006.01)
*B01D 53/04* (2006.01)
*B01D 53/26* (2006.01)

(52) U.S. Cl.
CPC ....... *B01D 53/0438* (2013.01); *B01D 53/261* (2013.01); *B01D 2257/504* (2013.01);
(Continued)

(58) Field of Classification Search
CPC ............ B01D 53/0462; B01D 53/0446; B01D 53/0476; B01D 53/261; B01D 53/62;
(Continued)

(56) References Cited

U.S. PATENT DOCUMENTS 4,971,606 A  11/1990 Sircar et al.
5,540,758 A  7/1996 Agrawal et al.
(Continued)

FOREIGN PATENT DOCUMENTS

EP    1 142 623 A2   10/2001
GB    1296889 A      11/1972
(Continued)

OTHER PUBLICATIONS

Chunfeng Song et al., "Design of a low-cost CO2 capture process based on heat integration technology", Energy Procedia, 2014, pp. 365-368, vol. 61.
(Continued)

*Primary Examiner* — Sharon Pregler
(74) *Attorney, Agent, or Firm* — Sughrue Mion, PLLC

(57) ABSTRACT

A method for separating carbon dioxide and water from a gas mixture by cyclic adsorption/desorption, using a unit containing an adsorber structure, comprising the following repeating steps: (a) contacting said mixture with sorbent material; (b) at least one of evacuating said unit and heating said sorbent material and extracting the gaseous carbon dioxide and water vapour and separating gaseous carbon dioxide from water vapour; (c) cooling the adsorber structure and re-pressurisation; wherein (i) in step (c) the heat released is stored in a first heat storage device; (ii) during step (b) the sensible and latent heat of gaseous carbon dioxide and water vapour as product gases is stored in second heat storage device; and (iii) during step (b) the heat required for heating said sorbent material is supplied from
(Continued)

heat recovered in at least one of step actions (i) and (ii) of previous sequence(s).

32 Claims, 7 Drawing Sheets

(52) U.S. Cl.
CPC .. *B01D 2257/80* (2013.01); *B01D 2258/0283* (2013.01); *B01D 2258/06* (2013.01)

(58) Field of Classification Search
CPC ........ Y02C 10/08; Y02C 20/40; Y02C 10/04; Y02C 10/06
See application file for complete search history.

(56) References Cited

U.S. PATENT DOCUMENTS

| | | | |
|---|---|---|---|
| 7,285,154 | B2 | 10/2007 | Karwacki, Jr. et al. |
| 8,163,066 | B2 | 4/2012 | Eisenberger |
| 2003/0037672 | A1* | 2/2003 | Sircar ................ B01D 53/0462 96/121 |
| 2009/0120288 | A1* | 5/2009 | Lackner ............ B01D 53/0462 95/68 |
| 2012/0174778 | A1 | 7/2012 | Eisenberger |
| 2012/0174779 | A1 | 7/2012 | Eisenberger |

FOREIGN PATENT DOCUMENTS

| | | |
|---|---|---|
| WO | 2010/022339 A2 | 2/2010 |
| WO | 2010/091831 A1 | 8/2010 |
| WO | 2011/137398 A1 | 11/2011 |
| WO | 2012/168346 A1 | 12/2012 |
| WO | 2014/012966 A1 | 1/2014 |
| WO | 2014/073004 A2 | 5/2014 |
| WO | 2014/170184 A1 | 10/2014 |
| WO | 2015/103401 A1 | 7/2015 |
| WO | 2016/005226 A1 | 1/2016 |
| WO | 2016/161998 A1 | 10/2016 |

OTHER PUBLICATIONS

M. R. W. Walmsley et al., "Thermocline Management of Stratified Tanks for Heat Storage", Proceedings of 12th International Conference on Process Integration, Modelling and Optimisation for Energy Saving and Pollution Reduction, Retrieved from the Internet, URL:https://core.ac.uk/download/pdf/29196629.pdf (Retrieved on Nov. 15, 2018).

Jocelyn Bonjour et al.," Temperature Swing Adsorption Process with Indirect Cooling and Heating", Industrial & Engineering Chemistry Research, 2002, pp. 5802-5811, vol. 41, No. 23.

Benoit Stutz et al., "Storage of thermal solar energy", Comptes Rendus Physique., 2017, pp. 401-414, vol. 18, No. 7-8.

Scapino Luca et al., "Sorption heat storage for long-term low-temperature applications: A review on the advancements at material and prototype scale", Applied Energy, 2017, pp. 920-948, vol. 190.

Rahman Aowabin et al., "Performance modeling and parametric study of a stratified water thermal storage tank", Applied Thermal Engineering, 2016, pp. 668-679, vol. 100.

International Search Report of PCT/EP2019/064609 dated Sep. 10, 2019 [PCT/ISA/210].

Written Opinion of PCT/EP2019/064609 dated Sep. 10, 2019 [PCT/ISA/237].

* cited by examiner

EFFICIENT METHOD AND DEVICE FOR ADSORPTION/DESORPTION OF CARBON DIOXIDE FROM GAS STREAMS

CROSS REFERENCE TO RELATED APPLICATIONS

This application is a National Stage of International Application No. PCT/EP2019/064609 filed on Jun. 5, 2019, claiming priority based on European Patent Application No. 18_177_796.2 filed on Jun. 14, 2018.

TECHNICAL FIELD

The present invention relates to an efficient method for separating gaseous carbon dioxide and water from a gas mixture, preferably air or flue gas or biogas, by cyclic adsorption/desorption using a sorbent material adsorbing said gaseous carbon dioxide. Furthermore the invention relates to a device for carrying out said method.

PRIOR ART

Gas separation by adsorption has many different applications in industry, for example removing a specific component from a gas stream, where the desired product can either be the component removed from the stream, the remaining depleted stream, or both. Thereby both, trace components as well as major components of the gas stream can be targeted by the adsorption process. One important application is capturing carbon dioxide (CO2) from gas streams, e.g., from flue gases, exhaust gases, industrial waste gases, biogas or atmospheric air.

Capturing CO2 directly from the atmosphere, referred to as direct air capture (DAC), is one of several means of mitigating anthropogenic greenhouse gas emissions and has attractive economic perspectives as a non-fossil, location-independent CO2 source for the commodity market, for the production of synthetic fuels and in order to enable negative CO2 emissions.

The specific advantages of CO2 capture from the atmosphere include: (i) DAC can address the emissions of distributed sources (e.g. cars, planes), which account for a large portion of the worldwide greenhouse gas emissions and can currently not be captured at the site of emission in an economically feasible way; (ii) DAC can address emissions from the past and can therefore create truly negative emissions; (iii) DAC systems do not need to be attached to the source of emission but are rather location independent and can for example be located at the site of further CO2 processing; and (iv) if CO2 that was captured from the atmosphere is used for the production of synthetic hydrocarbon fuels from renewable energy sources, truly non-fossil fuels for the transportation sector can be obtained, that create no or very few net CO2 emissions to the atmosphere. A positive side effect of adsorption/desorption-based DAC systems is that they supply water from the atmosphere, which can be used for different applications. e.g. synthesis of renewable fuels, as for example described in WO2016161998.

Several DAC methods have recently been developed based on various technological approaches. For example, U.S. Pat. No. 8,163,066 discloses carbon dioxide capture/regeneration structures and techniques; US 2009/0120288 discloses a method for removal of carbon dioxide from air; US 2012/0174778 discloses a carbon dioxide capture/regeneration method using a vertical elevator; and WO2010022339 discloses a carbon dioxide capture method and facility.

One particular approach is based on a cyclic adsorption/desorption process on solid, chemically functionalized sorbent materials. For example, in WO2010091831 a structure based on amine functionalized adsorbents materials together with a cyclic adsorption/desorption process using this material for the extraction of carbon dioxide from ambient atmospheric air is disclosed.

WO2016005226 describes a steam assisted vacuum desorption process using adsorbents for carbon dioxide capture from air. Therein, the adsorption process takes place at ambient atmospheric conditions at which air is streamed through the sorbent material and a portion of the CO2 contained in the air is chemically bound at the surface of the adsorbents. During and for the subsequent desorption, the material is heated and the partial pressure of carbon dioxide surrounding the sorbent is reduced by applying vacuum, in some embodiments together with the injection of steam. Thereby, the previously captured carbon dioxide is removed from the sorbent material and obtained in a concentrated form.

Aside from CO2 capture from ambient air, these processes can also be efficiently applied to capture CO2 from other gas streams with a higher CO2 concentration, for instance flue gas streams.

In WO2012168346, a sorbent material based on an amine functionalized cellulose adsorbent is disclosed, which among several alternatives can be used for the above described processes. In WO2014170184 a low pressure drop structure composed of particle adsorbent beds is disclosed which can be used for the above described processes. Typical adsorption/desorption processes include pressure swings, vacuum swings, temperature swings, microwave swings or purge processes with inert gases or a combination thereof. These known processes have specific fields of application; however, many of them are partially or completely unsuitable for DAC applications. For instance, because the concentration of CO2 in ambient atmospheric air is only about 400 ppm, i.e. roughly 0.04%, any pure pressure swing process would either require compression of large volumes of air during adsorption or need to evacuate desorption devices to very low absolute pressures, i.e. less than 0.04 mbar (a), to drive desorption. Both, such compression during adsorption as well as such a vacuum system is likely not to be feasible or economical on the very large scales required by DAC applications.

A pure temperature swing process is also limited in its usage because the typical adsorbents used for DAC (e.g. amine functionalized adsorbents) are prone to degradation at elevated temperatures which again limits the extent of the temperature swing and therefore the achievable cyclic yield when adsorbing CO2 from air at ambient atmospheric conditions.

While the usages of inert gas purge desorption with nitrogen or even air have been demonstrated, these methods have limited application for DAC since the desorbed CO2 is obtained in diluted form. Steam however is an inert gas which is condensable making it both recoverable and separable. Steam has been used for desorption in the fields of gas separation, soil treatment and more recently for DAC processes.

Certain combinations of the above mentioned methods have also been used. GB 1129543 applied nitrogen, air, and steam to complement vacuum swing desorption for recovering hydrocarbons. U.S. Pat. No. 5,540,758 desorbed various gases adsorbed at elevated pressures with a vacuum swing using air as a purge gas. U.S. Pat. No. 7,285,154 desorbed xenon by applying a nitrogen purge flow to a vacuum swing and by applying a nitrogen purge flow to a temperature swing. WO2014073004 applies a temperature-vacuum-swing process for CO2 adsorption/desorption from enclosed environments. EP 1142623 applied steam as a purge gas at high temperatures to desorb CO2 under a vacuum. GB1296889, WO2011137398 and US2012174779 applied a pure steam purge at atmospheric pressure to a solid sorbent to desorb CO2 captured out of the air.

Generally adsorption/desorption processes for capturing CO2 from air or from other gas streams are desired which offer low energy demand. The methods and devices described in WO2016005226 enable low energy demand by describing possibilities of first increasing the cyclic CO2 capacity of the system by a steam assisted vacuum desorption process and second recovering heat from condensation of water vapour originating from injected steam or desorbed water from the sorbent. WO2015103401 describes a system to remove CO2 from CO2 laden gas streams comprising at least two groups of carbon dioxide capture structures, where CO2 is regenerated by the injection of steam and where after steam injection heat is recovered from the hot structure to a second cold structure by pulling a vacuum in the hot structure, consequently evaporating remaining water in the structure and in such cooling the structure. The thusly generated steam is used to preheat a second structure.

Energy management has been examined for cyclic desorption processes in WO2014012966 in which thermal energy of the desorbate was utilized directly for steam generation.

Song et al (Energy Procedia 61 (2014) 365-368) report a novel self-heat recuperation technology has been applied to the PSA process to reduce the CO2 capture cost, wherein CO2 containing flue gas is highly pressurized for the adsorption stage. The detailed energy input of the proposed process is simulated using a process simulator, and the simulation results indicate that the heat of high pressure adsorption stage (exothermic reaction) can be significantly recovered by reaction heat transformer (RHT), and reused for adsorbent regeneration (endothermic reaction). Meanwhile, an expander is added to recover wasted pressure associated with residual gas. As a result, the energy consumption of the proposed process is reduced to 40% of that of the conventional process. The document fails to disclose heat storage or buffering unit. The document discloses a vapour compression cycle, so heat gained at one place must immediately be consumed at another place, requiring operation times of the two places to be essentially the same.

Walmsley et al (Proceedings of the 12$^{th}$ international conference on process integration, modelling and optimization for energy saving and pollution reduction, AIDIC, Rome, 2009) generally point out that stratified tanks are useful for maximizing the thermal energy efficiency of non-continuous and semi-continuous processes.

Bonjour et al (Ind. Eng. Chem. Res. 2002, 41, 5802-5811) report experimental results for a TSA process including a rapid heat exchanger for indirect cooling and heating. Experiments were performed for the removal and recovery of ethane from a nitrogen stream (simulating a VOC in air). In addition, a simplified one-dimensional nonisothermal nonequilibrium model of the process was developed. As temperature swing was the driving force in the process, specific efforts were made to evaluate the heat-transfer coefficient between the heating or cooling medium and the gas stream. From the combination of the experimental and numerical results, the influence of some parameters (e.g., regeneration temperature, initial feed composition) on the process efficiency, analyzed in terms of both recovered mass and energy consumption, was determined.

SUMMARY OF THE INVENTION

It is therefore an object of the present invention to provide for a more thermodynamically optimal method for separating gaseous carbon dioxide alone (or both gaseous carbon dioxide and water) from a gas mixture. Said gas mixture is preferably at least one of air, flue gas, and biogas, and it is preferably provided and adsorbed in the process under ambient conditions, i.e. 0.8 to 1.2 bar (a) at a temperature −40 to 60° C., more typically −30 to 45° C. or even more preferably normally in the range of 10-35° C. Said gas mixture contains said gaseous carbon dioxide and water vapour as well as further gases different from gaseous carbon dioxide and water vapour. Separation takes place by cyclic adsorption/desorption using a sorbent material adsorbing at least said gaseous carbon dioxide.

This object is achieved by the method according to claim 1.

The proposed method is using at least one unit containing an adsorber structure with said sorbent material, the unit being openable to flow-through of said gas mixture and for contacting said gas mixture with the sorbent material for the adsorption step, under ambient conditions, evacuable to a vacuum pressure of 500 mbar (a) or less (mbar (a) stands for absolute pressure normalized for sea level), and the adsorber structure located in said unit being heatable to a temperature of at least 50° C. for the desorption of at least said gaseous carbon dioxide or carbon dioxide and water vapour.

Although chemically and physically identical, a terminological distinction is made here between water vapour being gaseous water present in a gas mixture like the adsorbate air or in a mixture with desorbate gases and steam being gaseous water purposefully supplied to the device as part of the method.

The proposed method comprises the following sequential and in this sequence repeating steps:

(a) contacting said gas mixture with said sorbent material to allow at least said gaseous carbon dioxide with or without water vapour to adsorb on the sorbent material under ambient atmospheric pressure conditions in the range of 0.8 to 1.2 bar (a) in an adsorption step. Preferably this step takes place under ambient temperature conditions, i.e. under temperature conditions which are essentially the same as the surrounding air at the moment of operation. Further preferably this step takes place under pressure conditions which are essentially the same as the surrounding air at the moment of operation. Preferably therefore the gas mixture is contacted with said sorbent material essentially without any pretreatment such as pressurisation and/or heating, the gas mixture, preferably surrounding atmospheric air, is simply circulated through the sorbent material. Typically the specific flow volume during the absorption step is in the range of 30-1000 (Nm$^3$/h)/kg sorbent more preferably in the range of 40-350 (Nm$^3$/h)/kg sorbent, wherein N stands for standard temperature and pressure, which is 0° C. und 100 kPa;

(b) at least one of evacuating said unit to a pressure in the range of 20-400 mbar (a) and heating said sorbent material in said unit to a temperature in the range of 50-180° C. preferably in the range of 80-120° C., in a desorption step and extracting at least the desorbed gaseous carbon dioxide and desorbed water vapour or desorbed gaseous carbon dioxide and water vapour originating from injected steam from the unit and separating gaseous carbon dioxide from water vapour by water condensation downstream of the unit;

(c) actively cooling the adsorber structure with said sorbent material in said unit to a temperature larger or equal to ambient atmospheric temperature and re-pressurisation of the unit to ambient atmospheric pressure conditions (preferably first the adsorber structure with said sorbent material in said unit is cooled to a temperature larger or equal to ambient atmospheric temperature and only then re-pressurisation of the unit to ambient atmospheric pressure conditions takes place to avoid damage of the sorbent by oxygen at high temperatures).

Active cooling within step (c) is to be understood as cooling not only relying on heat losses to the environment. Active cooling may thus involve a heat removal fluid such as a heat exchange liquid in corresponding tubing but also e.g. forced ambient atmospheric air flowing through the structure. Further in one possible realization of active cooling, the adsorber structure may be exposed to progressively reduced pressures from that of step (b) for example generated by a vacuum system whereby any water vapour held on or in the sorbent material will evaporate and thereby cool the adsorber structure. Optionally, the latent heat of condensation of thusly evaporated water vapour could be recovered with the herein described devices and methods.

That method is in particular characterised by the following elements (step actions):

(i) in step (c) at least parts of the heat released by the adsorber structure with said sorbent material in said unit during cooling is recovered and stored in a first heat storage device and used for other process steps in said unit or in at least one different but equivalent unit operated in essentially the same manner in parallel; and/or (ii) wherein during step (b) at least parts of at least one of the sensible and latent heat of gaseous carbon dioxide and water vapour extracted from the unit is recovered and stored in a second heat storage device and used for other process steps in said unit or in at least one different but equivalent unit operated in essentially the same manner in parallel; and (iii) wherein during step (b) at least parts of the heat required for heating said sorbent material in said unit (1) is supplied from heat recovered in at least one of step actions (i) and (ii) of previous sequence(s) of said unit (1) and/or of at least one different but equivalent unit operated in essentially the same manner in parallel.

Preferably, at least one of (i) or (ii) is implemented in combination with (iii), more preferably at the same time (i), (ii) as well as (iii) are implemented. So (i) is used in combination with (iii), or (ii) in combination with (iii), or the combination of (i), (ii) and (iii) is used.

Preferably the processes operated in a way such that step a) takes longer than step b). Usually for DAC applications or for flue gas carbon dioxide recovery the flow-through step a) is 1.5-6, preferably 2-3 times longer than the desorption step b). Preferably therefore the processes operated with more than two units operated in parallel, for example to have, at a time, two units which are in step a) and one unit which is concurrently in step b).

It should be noted that the unit containing an adsorber structure can be a single unit which at the same time provides for the function of being evacuable and being heatable and coolable for the corresponding steps. However the unit can also be modular and comprise a first zone which can be evacuated, and for example a second zone which can be heated or cooled, and the adsorber structure is shifted between the two zones as a function of the respective step in which the system is at that moment in time.

The steps (a)-(c) are thus carried out in this sequence as often as necessary and desired, in the sense of (a)-(b)-(c)-(a)-(b)-(c)- . . . or similarly expressed (a)-(b)-(c)-n with n any integer above 2, normally in the range of at least 100 or of at least 1000 or of at least 10'000.

In the context of this disclosure, the expressions "ambient atmospheric pressure" and "ambient atmospheric temperature" refer to the pressure and temperature conditions to which a plant that is operated outdoors is exposed to, i.e. typically ambient atmospheric pressure stands for pressures in the range of 0.8 to 1.1 bar (a) normalized for sea level and typically ambient atmospheric temperature refers to temperatures in the range of −40 to 60° C., more typically −30 to 45° C., more preferably in the range of 10-35° C. Preferably the gas mixture used as input for the process is atmospheric air, which normally implies a CO2 concentration in the range of 0.03-0.06% by volume. However, also air with lower or higher CO2 concentration can be used as input for the process, e.g. with a concentration of 0.1-0.5% by volume, so generally speaking preferably the input CO2 concentration of the input gas mixture is in the range of 0.01-0.5% by volume.

According to a first preferred embodiment of the proposed method said first and second heat storage device are one combined heat storage device, preferably one which is able to take up and make available different levels of temperature.

According to yet another preferred embodiment the heat required for heating said sorbent material in said unit according to step action (iii) is at least partly or fully supplied from at least one of said first and second heat storage device or from said combined heat storage device.

Said combined heat storage device can preferably be a stratified tank, having zones of different temperature and means for extracting selectively from these zones. The stratified tank may contain at least one phase change material and/or a heat exchange fluid, wherein said heat exchange fluid is preferably water or a water/glycol mixture.

Further preferably from the same stratified tank heating liquid for step (b) and cooling liquid for step (c) is extracted from the stratified tank from different zones thereof.

According to yet another preferred embodiment heat is recovered during the cooling in step (c) by way of a heat exchange fluid that is returned from a heat exchanger element in the adsorber structure to the stratified tank. On the other hand however it is also possible to use the desorbate gas itself or forced ambient atmospheric air flow as the working fluid, and to recover the cooling heat in step (c) by corresponding heat extraction from this desorbate gas or forced ambient atmospheric air flow, to be then used according to (i).

Preferably, the heat exchange fluid that is returned from the adsorber structure, or a exchange fluid which is heated by heat transfer from the desorbate gas or the forced ambient atmospheric air flow, is introduced, e.g. through a system of mechanical flow distributors preventing mixing into the stratified tank (not actively regulated) or through an actively regulated series of isolation valves to a corresponding zone of the stratified tank as a function of the temperature of the heat exchange fluid/desorbate gas/forced air that is returned from the adsorber structure and as a function of the temperature of the respective zone.

Further preferably, heat exchange fluid that is returned from the adsorber structure or heated by heat transfer from the desorbate gas or forced ambient atmospheric air flow is introduced into a zone of the stratified tank having the same or a temperature in the range of +/−5° C. with respect to the temperature of the heat exchange fluid/desorbate gas/forced air that is returned from the adsorber structure.

Heat exchange fluid or such heated by heat transfer from the desorbate gas can be extracted from the heat storage device during process steps (b) and/or (c) by sequentially opening and closing isolation valves and optionally mixing at least two of the resulting flows with the mixing valve. The temperature of the feed heat exchange fluid passed to the unit during the process step (b) is preferably less than 40° C., more preferably less than 20° C. higher than the temperature of the unit and preferably during step (c), the temperature of the feed heat exchange fluid is less than 30° C. preferably less than 20° C. lower than the temperature of the unit. The number of valves—defining the number of usable temperature levels can be in the range of 2-10, preferably 2-6.

An external heat source can for example be employed to further heat zones of or all of the stratified tank via an internal heat exchanger in the stratified tank and/or via a heat exchanger in the inlet or return flow of the heat exchange fluid that is circulated between the heat exchanger element and the stratified tank.

Another preferred embodiment is characterized in that the sensible and latent heat of the water vapour, e.g. originating during desorption from the sorbent and/or injected steam, that is recovered during step (b) is accepted by at least one, preferably a series connection of more than one, heat exchanger(s), which in turn is/are passing said heat to a circulating heat exchange fluid which in turn is passing the heat to a stratified tank as a storage device and wherein preferably the stream of steam and/or extracted gaseous carbon dioxide and water vapour from the unit is compressed by a compressor or vacuum pump to a pressure of at least 0.3 bar (a) or at least 1.1 bar (a), preferably at least 1.4 or 1.7 bar (a) prior to entering the at least one heat exchanger thereby increasing the temperature of condensation of the steam and/or water vapour.

The stream of steam and/or extracted gaseous carbon dioxide and water vapour from the unit can preferably be passed in a downward flow direction through an internal heat exchanger contained within the stratified tank, preferably substantially over its entire height, whereby the heat of condensation is directly transferred to the stratified tank substantially at the level corresponding to the temperature of condensation, and wherein preferably the stream of steam and/or extracted gaseous carbon dioxide and water vapour from the unit is compressed by a compressor or vacuum pump to a pressure of at least 0.3 bar (a) or at least 1.1 bar (a), preferably at least 1.4 or 1.7 bar (a) prior to entering the internal heat exchanger contained within the stratified tank thereby increasing the temperature of condensation of the steam and/or water vapour.

According to yet another preferred embodiment, optionally a first pre-condenser can remove at least a portion of the water vapour from the stream of steam and/or extracted gaseous carbon dioxide and water vapour from the unit producing an ejection stream of condensate and a flow of condensation heat Qpc which can be passed to the thermal storage device before preferably passing the remaining gaseous stream to a compressor or vacuum pump which increases the pressure of the stream of steam and/or extracted gaseous carbon dioxide and water vapour from the unit from the vacuum pressure only to an intermediate pressure of at least 0.3 bar (a) before passing the stream through the heat exchanger(s) inside or outside the stratified tank and thereby passing the heat of condensation of water vapour as well as parts of the sensible heat of the stream directly or indirectly to the heat exchange fluid in the stratified tank.

According to yet another preferred embodiment, the original gaseous stream extracted from the unit or the remaining gaseous stream downstream of the pre condenser is passed to a first compressor or vacuum pump, which increases the pressure of the stream of steam and/or extracted gaseous carbon dioxide and water vapour from the unit from the vacuum pressure to an intermediate pressure of at least 0.3 bar (a) before passing the stream through the heat exchanger(s) inside or outside a stratified tank and thereby passing the heat of condensation of water vapour/steam as well as parts of the sensible heat of the stream directly or indirectly to the heat exchange fluid in a stratified tank.

According to yet another preferred embodiment, optionally a post condenser optionally removes a final portion of condensate and passes another portion of condensation heat Qpc to the thermal storage device and the remaining gaseous stream to a second compressor or vacuum pump downstream which accomplishes the final pressure increase to the delivery pressure of at least 1.0 bar(a), and wherein preferably the intermediate pressure and the extraction point from the stratified tank of water vapour and/or extracted gaseous carbon dioxide can be flexibly adjusted to adjust the ratio of water vapour that is condensed in the heat exchanger(s) to the non condensable gas content.

Step (c) may involve actively cooling the adsorber structure with said sorbent material in said unit under a pressure in the range of 20-400 mbar (a) to a temperature larger or equal to ambient atmospheric temperature and subsequent re-pressurisation of the unit to ambient atmospheric pressure conditions.

According to another preferred embodiment, in step (b) steam is injected into the unit to flow-through and contact the sorbent material under saturated steam or superheated steam conditions with a superheated steam temperature of up to 180° C. at the pressure level in said unit, and wherein the molar ratio of steam that is injected during the entire step (b) to the gaseous carbon dioxide released during the entire step (b) is less than 40:1 or less than 100:1 wherein said ratio can be adapted to the nature of the sorbent used.

At least part of the heat of condensation of the injected steam can be recovered and stored in a heat storage device or used for other process steps, together with the sensible and latent heats of the desorption gases extracted from the sorbent material during step (b), preferably in the same heat storage device as the storage defined in step action (i) and/or (ii), most preferably in the form of a stratified tank.

The steam injected in step (b) can preferably be generated at least partly using heat recovered in accordance with step action (i) and/or (ii), wherein preferably the steam is produced at least in part from heat extracted from the heat storage device, preferably in the form of a stratified tank.

According to yet another preferred embodiment, the steam that is injected into the unit during step (b) is preferably at least partly produced by evaporating water in a heat exchanger fed by or embedded in the (circulating) heat exchange fluid from the stratified tank between a temperature level of a least 30° C. and 100° C. or a least 30° C. and 180° C. wherein the heat exchange fluid can originate from flows from specific points in the stratified tank by extraction through specific isolation valves optionally with mixing said extracted flows.

The steam that is injected into the unit during step (b) can at least partly be produced by evaporating water flowing in an upward flow direction in an internal heat exchanger contained within the stratified tank, substantially over its entire height whereby the heat of evaporation is directly transferred from the stratified tank to the water substantially at the level corresponding to the temperature of evaporation and preferably self-regulated by the current pressure level of the desorbing unit.

According to the above aspects of the invention and in particular when using heat exchangers integrated internally into the thermal storage device, the specific heat exchange area of the primary condenser or series of primary condensers as well as the vaporizer or series of vaporizers can lie in the range of 10-400 $m^2$/ton of sorbent material preferably in the range of 40-100 $m^2$/ton of sorbent material. Furthermore, for a configuration wherein the heat exchanger or series of heat exchangers are external to a thermal storage device and a circulating flow passes heat transfer fluid from the thermal storage device, the specific area can lie in the range 5-250 $m^2$. It is to be understood that various suitable sorbent materials, process sequences and steam and vapour contents respectively define the required specific heat exchange areas.

According to yet another preferred embodiment, the heat transfer to and from the adsorber structure and/or the sorbent material in said unit during steps (b) and (c) is at least partly effected by a heat exchanger element provided in the adsorber structure, preferably involving a heat exchange fluid circulated through the heat exchanger element.

Preferably in this context step (b) comprises at least the following sequential steps:

(b1) preheating said sorbent material in said unit to a temperature in the range of 35-80° C., preferably in the range of 45-75° C., while the highest temperature of the heat exchanger element and preferably the inlet temperature of the heat exchange fluid circulating through the heat exchanger element is below 80° C. during this preheating phase;

(b2) further heating the sorbent material in said unit to a temperature in the range of 80-180° C., preferably in the range of 90-140° C.

The heat that is recovered from the unit during cooling in step (c) can be directly transferred, preferably via a heat exchanger element provided in the adsorber structure and a heat transfer fluid, to a second unit containing a heat exchanger element in its adsorber structure which at this time is in step (b) and accepts the heat for heating its sorbent material.

Another preferred embodiment is characterized in that the heat that is recovered from a series of at least two units during cooling in step (c) is directly transferred via a heat exchange fluid that passes through heat exchanger elements provided in the adsorber structures of said series of units in a serial flow configuration to a second series of at least two units containing corresponding heat exchanger elements in their adsorber structures through which the heat exchange fluid also passes in a serial flow configuration.

According a further preferred aspect of this invention, a control strategy can be applied to maintain the thermal energy content of the thermal storage device at a sufficient level to always enable cyclic operation and specifically the production of purging vapour in the vaporizer. According to this aspect, heat transfer fluid extracted from the thermal storage device passes through an external heat source before passing onto the adsorber structure in desorption, wherein at temperatures below 40° C., preferably below 25° C., the temperature of the feed heat transfer fluid extracted from the thermal storage device is set between 0.1 and 5° C., preferably less than 2° C. lower than that of said heat transfer fluid downstream of the external heat source wherein preferably said temperature reduction is realized by varying the point of extraction of feed heat transfer fluid through specific isolation valves or by varying the mixing ratio of two or more extracted flows, further wherein preferably the external heat source compensates the reduction in temperature by an increase in external heat delivery.

At least two units or more, for example 3, four, five, six or seven or even eight units can be connected by two or correspondingly more parallel sets of heat transfer circuits with independent fluid streams but connected by way of at least one common heat storage device.

During the at least last 5 minutes of the adsorption step (a) a heat exchange fluid can advantageously be circulated through the heat exchanger element of the unit, heating the adsorber structure and the sorbent material to above ambient air temperature and consequently reducing the relative humidity of the ambient air stream in comparison to the relative humidity at the original ambient temperature of the air stream, and/or wherein during at least part of the adsorption step (a) a heat exchange fluid is circulated through the heat exchanger element of the unit to recover the released heat of adsorption.

Furthermore the present invention relates to the use of a method as detailed above for the separation of carbon dioxide from an ambient air stream.

It furthermore relates to a device for carrying out a method as detailed above, said device comprising at least one unit containing an adsorber structure with said sorbent material, the unit being openable to flow-through of said gas mixture and for contacting said gas mixture with the sorbent material for the adsorption step, evacuable to a vacuum pressure of 500 mbar (a) or less, and the adsorber structure located in said unit being heatable to a temperature of at least 50° C. for the desorption of at least said gaseous carbon dioxide and water vapour, wherein the device is adapted and suitable for the following sequential and in this sequence repeating steps:

(a) contacting said gas mixture with said sorbent material to allow at least said gaseous carbon dioxide with or without water vapour to adsorb on the sorbent material under ambient atmospheric pressure conditions in the range of 0.8 to 1.2 bar (a) in an adsorption step. Preferably this step takes place under ambient temperature conditions, i.e. under temperature conditions which are essentially the same as the surrounding air at the moment of operation. Further preferably this step takes place under pressure conditions which are essentially the same as the surrounding air at the moment of operation. Preferably therefore the gas mixture is contacted with said sorbent material essentially without any pretreatment such as pressurisation and/or heating, the gas mixture, preferably surrounding atmospheric air, is simply circulated through the sorbent material. Typically the specific flow volume during the absorption step is in the range of 30-1000 ($Nm^3$/h)/kg sorbent, more preferably in the range of 40-350 ($Nm^3$/h)/kg sorbent, wherein N stands for standard temperature and pressure, which is 0° C. und 100 kPa;

(b) at least one of evacuating said unit to a pressure in the range of 20-400 mbar (a) and heating said sorbent material in said unit to a temperature in the range of 50-180° C. preferably in the range of 80-120° C., in a desorption step and extracting at least the desorbed gaseous carbon dioxide and water vapour from the unit and separating gaseous carbon dioxide from water vapour by water condensation downstream of the unit;

(c) actively cooling the adsorber structure with said sorbent material in said unit to a temperature larger or equal to ambient atmospheric temperature and re-pressurisation of the unit to ambient atmospheric pressure conditions;

wherein the device further comprises (i) means for recovery in step (c) of at least parts of the heat released by the adsorber structure with said sorbent material in said unit during cooling and a first heat storage device for storing the recovered heat for use for other process steps in said unit or in at least one different but equivalent unit operated in essentially the same manner in parallel; and (ii) means for recovery during step (b) of at least parts of at least one of the sensible and latent heat of gaseous carbon dioxide and water vapour as product gases and a second heat storage device for storing the recovered heat for used for process steps in said unit or in at least one different equivalent unit operated in essentially the same manner in parallel; and (iii) wherein at least one of said first and second heat storage of said unit, and/or of at least one different but equivalent unit operated in essentially the same manner in parallel, is provided to supply during step (b) at least parts of the heat required for heating said sorbent material in said unit.

Preferably, at least one of (i) or (ii) is implemented in combination with (iii), more preferably at the same time (i), (ii) as well as (iii) are implemented.

Preferably, in such a device the adsorber structure contains an internal heat exchanger element through which is flown through by a heat exchange fluid. Alternatively, it is also possible to use the desorbate gas itself or forced ambient atmospheric air flow as the working fluid, and to recover the cooling heat in step (c) by corresponding heat extraction from this desorbate gas or forced ambient atmospheric air flow, to be then used according to (i).

Further preferably in such a device at least one unit, preferably a multitude of units, is connected to a common stratified tank combining said first and second heat storage with split and multiple temperature levels allowing to use the low temperature zone in the range 30-60° C. for process cooling during the desorption when simultaneously heat at higher temperatures in the range 60-180° C. pref. 60-150° C. is being extracted for heating.

According to a preferred embodiment of said device, but also in the context of the above method, the sorbent material is an amine-functionalized solid adsorbent or $X_2CO_3$, wherein X is K, Na, Li or a mixture thereof, preferably impregnated onto a porous granular support, preferably active carbon. For example the material can be a weak-base ion exchange resin and/or amine-functionalized cellulose and/or amine-functionalized silica and/or amine-functionalized carbons and/or amine-functionalized metal organic frameworks and/or other amine-functionalized polymeric adsorbents.

Further embodiments of the invention are laid down in the dependent claims.

BRIEF DESCRIPTION OF THE DRAWINGS

Preferred embodiments of the invention are described in the following with reference to the drawings, which are for the purpose of illustrating the present preferred embodiments of the invention and not for the purpose of limiting the same. In the drawings.

DESCRIPTION OF PREFERRED EMBODIMENTS

Figure 1:
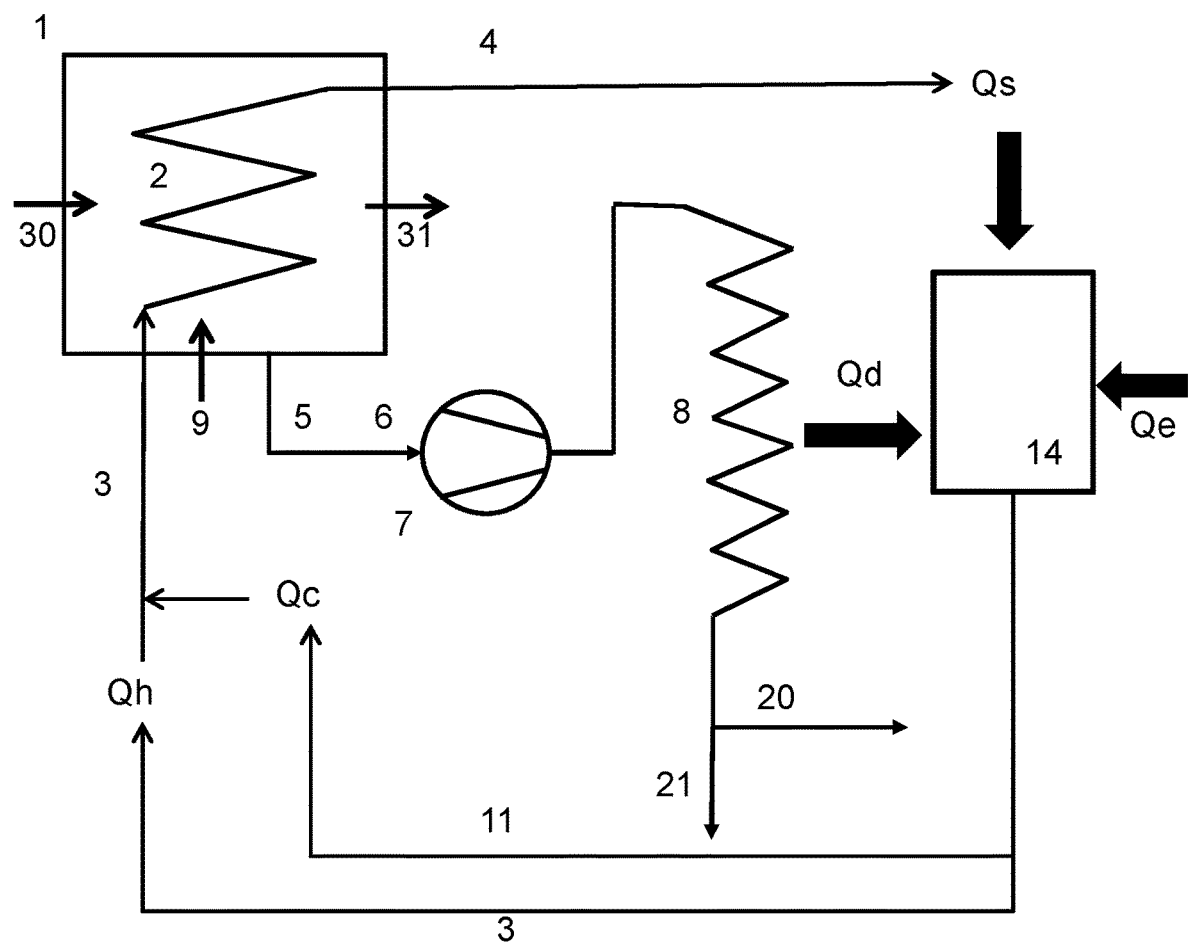
FIG. 1 shows a general energy management scheme showing possible energy flows for recovery and usage within one unit.

A first embodiment for a possible energy management system is shown in FIG. 1 implementing a method for recovering the invested thermal energy needed for the desorption process. A unit 1 is provided containing an adsorption structure 2 with sorbent material. Air enters the unit 1 along path 30 for adsorption and depleted air exits along path 31 for above step (a).

The unit 1 is connected to feed heat transfer fluid 3 supplying a heat flow Qh at a temperature between 40° C. and 180° C., preferably 65-150° C., and leaving the unit via a return heat transfer fluid 4. The heat for the desorption process Qh in above step (b) is made up of the heat of desorption of the relevant species, the sensible heat of the unit and losses. For desorption in step (b), further steam can by injected by way of path 9.

For the cooling step in (c), cool "heating" liquid is used with the same heat exchange means in the unit, as schematically illustrated by way of Qc via line 11. The cool liquid can, as illustrated in FIG. 1, be supplied by a storage device 14, if that storage device 14 provides for extraction of different levels of temperature, e.g. in case of a stratified storage tank. Alternatively, a separate supply system can be provided.

The produced desorption gases 5 from step (b) being a mixture of condensable and inert species, preferably CO2 and H2O, are extracted from the unit 1 through vacuum line 6 by a primary compression device 7, preferably a noncondensing vacuum pump, delivering said compressed mixture to the primary condenser 8 at a pressure of between 1.0 and 1.8 bar (a) preferably 1.1-1.6 bar (a) which extracts at least a portion of the latent and sensible heat of the desorption gases Qd invested as a portion of Qh into the desorption process, wherein said heat Qd can be directly reused or stored in unit 14.

The process heat Qh supplied to the process can in this manner in at least part stem from the recovered latent and sensible heat of the desorption gases Qd. As not all energy necessary for the desorption heat Qh can be recovered from the sensible heat Qs and latent and sensible heat of desorption gases Qd, external heat Qe must be applied.

Further, the feed heat transfer fluid feed 3 can supply cold heat transfer fluid Qc to a hot unit 1 in step (c) thereby extracting sensible heat Qs from said unit by means of the return heat transfer fluid 4 wherein the heat Qs can be reused or stored in unit 14.

Herein described is therefore a device for recovering at least a portion of the invested heat for a desorption process in the form of latent and/or sensible heat of desorption gases as well as at least a portion of the sensible heat of the unit thereby improving the energy efficiency of a cyclic adsorption desorption process.

Figure 2:
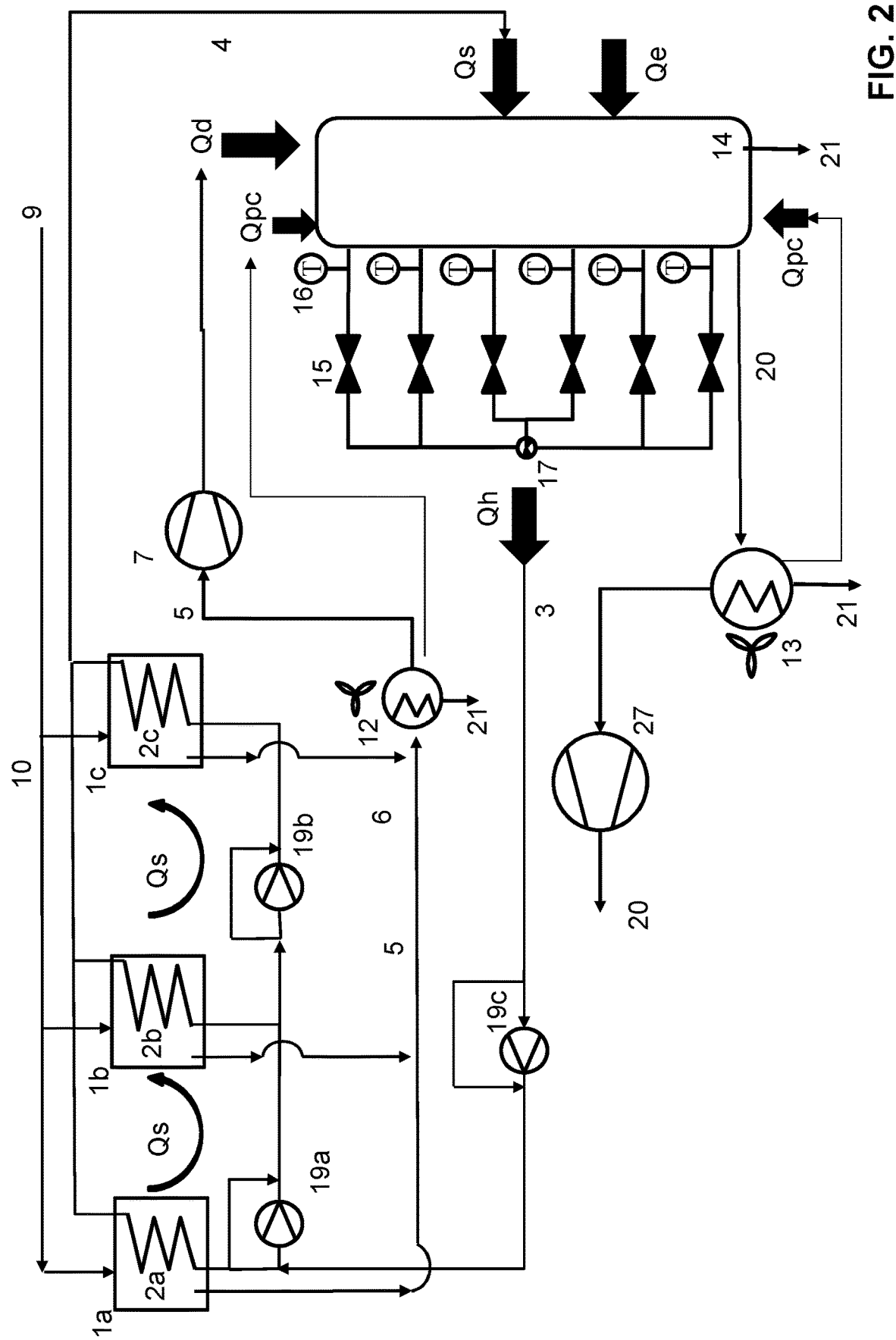
FIG. 2 shows a general energy management scheme showing possible energy flows for recovery and usage among three units and a thermal storage device.

FIG. 2 illustrates the operation of the process sequence including the recovery of sensible heat Qs for the case of multiple parallel equivalent units, and the sensible and latent heat of desorption gases on three units 1a,b,c, each containing adsorber structures 2a,b,c working all in the above described sequence but with steps shifted in time such that at a given moment in time one unit may be desorbing (step b), one may be adsorbing (step a) and one may be in another intermediate step, e.g. in step c.

However the proposed method is equally applicable for the situation where there is just one unit as in given FIG. 1.

The number of units and distribution of process steps is not limited to three, but influenced by the scaling of the whole installation, the duration of each step and the type of heat transfer fluid circuit design and it is to be understood that the same principle can be expanded to more than three units.

The units 1 are connected to a thermal storage device 14 comprising at least one tank filled with at least a heat transfer fluid, but possibly also at least one phase change material by at least one circuit of heat transfer fluid conduits. Optionally, two heat transfer fluid circuits can be used for hot and cold heat transfer fluid independently. Further the units can be connected between each other with by-passable circulation pumps 19a,b,c which enable the direct recovery of Qs between units.

To illustrate the operation of the method it is assumed that at one point in time unit 1a is to be heated for desorption—process step b)—and unit 1b is to be cooled—process step c).

To accomplish this, firstly the circulation pump 19a can be engaged which pumps heat transfer fluid in a closed loop (counter-clockwise in the figure, see arrow Qs) between the units 1a and 1b thereby transferring at least part of the sensible heat Qs of unit 1b to the unit 1a thereby heating unit 1a and cooling unit 1b.

Once the temperatures of the two units have substantially equalized, feed heat transfer fluid can be flown to the cooling unit 1b from the storage device 14, wherein appropriate cold heat transfer fluid is extracted from the storage device by the circulation pump 19c through at least one of the control valves 15 passing optionally through a mixing valve 17 to achieve a specific cooling temperature and returning hot heat transfer fluid exiting unit 1b to the storage device 14, thereby recovering at least a further portion of the remaining sensible heat Qs of the unit 1b.

Once the final cool temperature of the unit is achieved the flow of feed heat transfer fluid is altered to deliver hot heat transfer fluid to the unit 1a from the storage tank 14 whereby return cool heat transfer fluid is reinjected into the tank and wherein the process heat Qh in the temperature range of 40 and 180° C., preferably 65-150° C., may stem at least in part from previously recovered sensible heat Qs. An example of this procedure is described in Example 1 further below.

In the embodiment employing parallel hot and cold heat transfer circuits, the direct recovery of sensible heat Qs between units takes place in the same manner however at least two storage tanks—one for hot heat transfer fluid in the range of 60-180° C. preferably 60-150° C. and one for cold heat transfer fluid in the range of 30-60° C. are required with independently operating circulation pumps. The hot heat transfer fluid circuit can have any of the previously mentioned methods for addition of Qe from an external heat source such as an interface heat exchanger with an external heat supply in the storage tank or in the feed or return heat transfer fluid lines whereas the cold heat transfer fluid tank must have a method of removal of heat. One possibility is to flow heat transfer fluid through a unit 1 during adsorption—effectively using this device as an air cooler, simultaneously offering the possibility of tuning the adsorption conditions (temperature and relative humidity). A parallel circuit embodiment offers a number of advantages over a single circuit as it allows for shorted cycle times, tempering of the adsorber structure in the unit to dampen fluctuations in adsorption conditions and the recovery of the heat of adsorption.

One possible embodiment of the storage device 14 is a stratified tank which can store heat transfer fluid in the temperature range of 30-180° C., preferably 40-150° C., from which feed heat transfer fluid 3 is supplied by extracting it from different temperature zones in the stratified tank. The stratified tank establishes and maintains a temperature range in the heat transfer fluid with increasing temperature from the bottom of the tank towards the top. The stratified tank can be equipped with at least one, preferably at least 5 feed lines each with an isolation valve 15 and temperature measurement 16. In this manner, feed heat transfer fluid at a specific desired temperature level can be extracted and monitored. The extraction point can be varied during the heating and cooling process to best match the process demands. In addition, a mixing valve 17 can be used to further improve the temperature control of the feed heat transfer fluid 3. The return heat transfer fluid 4 can be fed into the stratified tank 14 through at least one port and a mechanical flow distributor 18 such as a diffusor or flaps which allow the return heat transfer fluid to distribute itself within the tank based on its temperature and density without exergy destroying mixing. The units 1 can thusly be supplied with hot heat transfer fluid and heating energy Qh drawn from upper portions of the stratified tank while returning cold heat transfer fluid to lower portions of the stratified tank. Once said unit is to be cooled, the previously returned cold heat transfer fluid can again be flown into the unit taking up the sensible heat of the unit Qs, returning it to the stratified tank 14 for storage and future usage. Further, the units can be supplied with a temperature of feed heat transfer fluid which is optimized for the speed of heat transfer while minimizing exergy destruction. Details of this procedure are described in Examples 2 & 3 further below. Further process heat from the storage device can be used for other process steps such as to generate vapor 9 which may be supplied to the units as a purge gas.

During production of desorption gas 5 in step (b)—being a mixture of condensable and inert species ($CO_2$ and water in a molar ratio between 1:0.001 and 1:50) the gases can pass first through a pre-condenser 12—for example an air cooler—in which least a portion of the condensable species present in the desorption gases can be removed as condensate 21 before passing through a primary compression device 7 primarily elevating the pressure of the desorption gasses 5 to between 0.3 and 1.8 bar (abs) and passing the latent and/or sensible heat thereof subsequently to the thermal storage device 14 in which at least a portion of the latent and sensible heat of the desorption gases $Q_d$ is taken up and if need be stored, thus producing a flow of product gas 20 and a flow of condensate 21. A portion of the condensation heat $Q_{pc}$ can also be passed to the thermal storage device 14.

The operation of the pre-condenser 12 and the primary compression device 7 can be tuned to realize an optimization of applied mechanical work for compression and recoverable energy $Q_d$. Lower water content in the desorption gas 5 (more condensed water) reduces both the recoverable energy $Q_d$ and the invested mechanical work for compression W. Example 8 given below illustrates the impact of various operation settings. If the product gas 20 is below the pressure needed by the consumer a further combination of a post-condenser 13 and secondary compression device 27 can be applied offering the option for a final recovery of condensation heat $Q_{pc}$. The advantage of such a combination is that undesirable condensable species of the product gas can be removed and the mechanical energy invested can be reduced. A flow of condensate 21 is extracted from the various condensation stages and can be disposed or utilized for the production of steam 9 as purge gas of the units delivered through the steam conduit 10.

Figure 3:
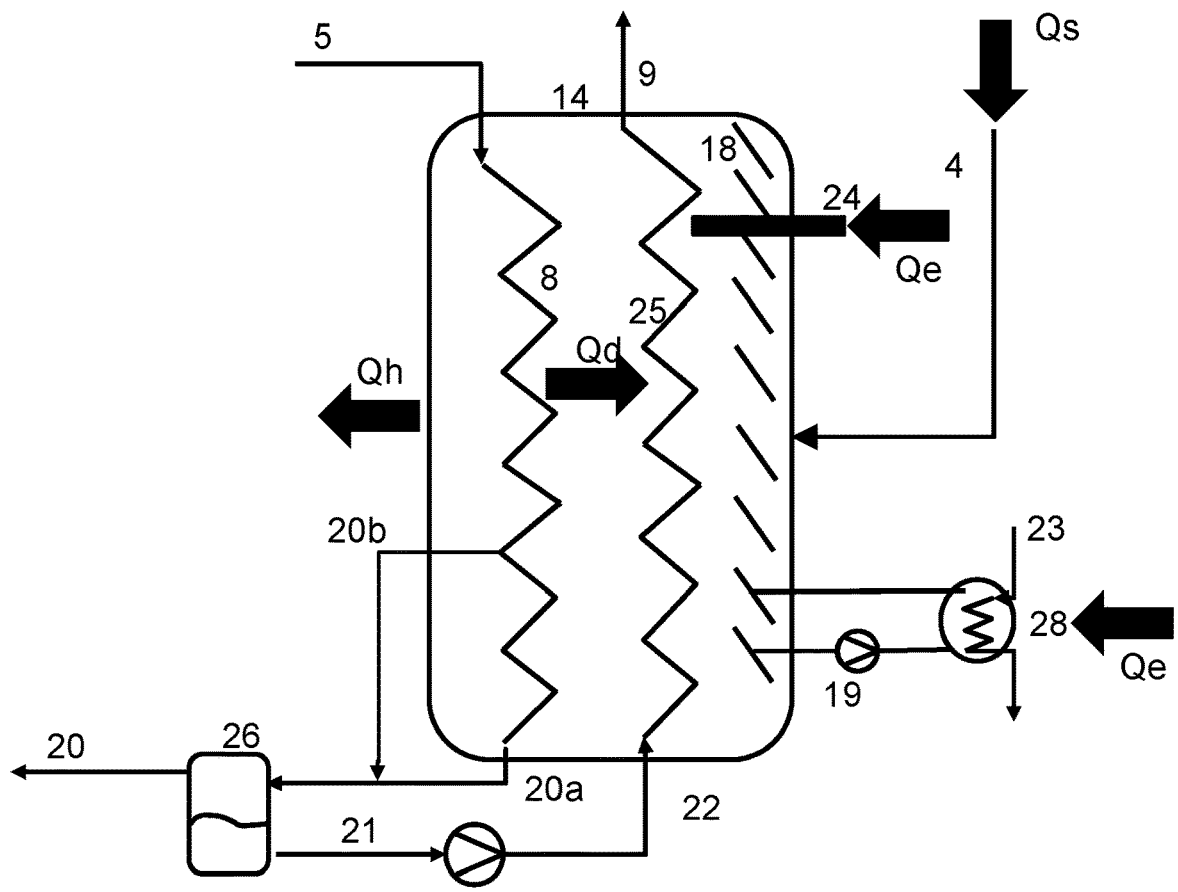
FIG. 3 shows details of a stratified tank thermal storage device with internal condensation and vaporization heat exchangers and heat and media flows.
Figure 7:
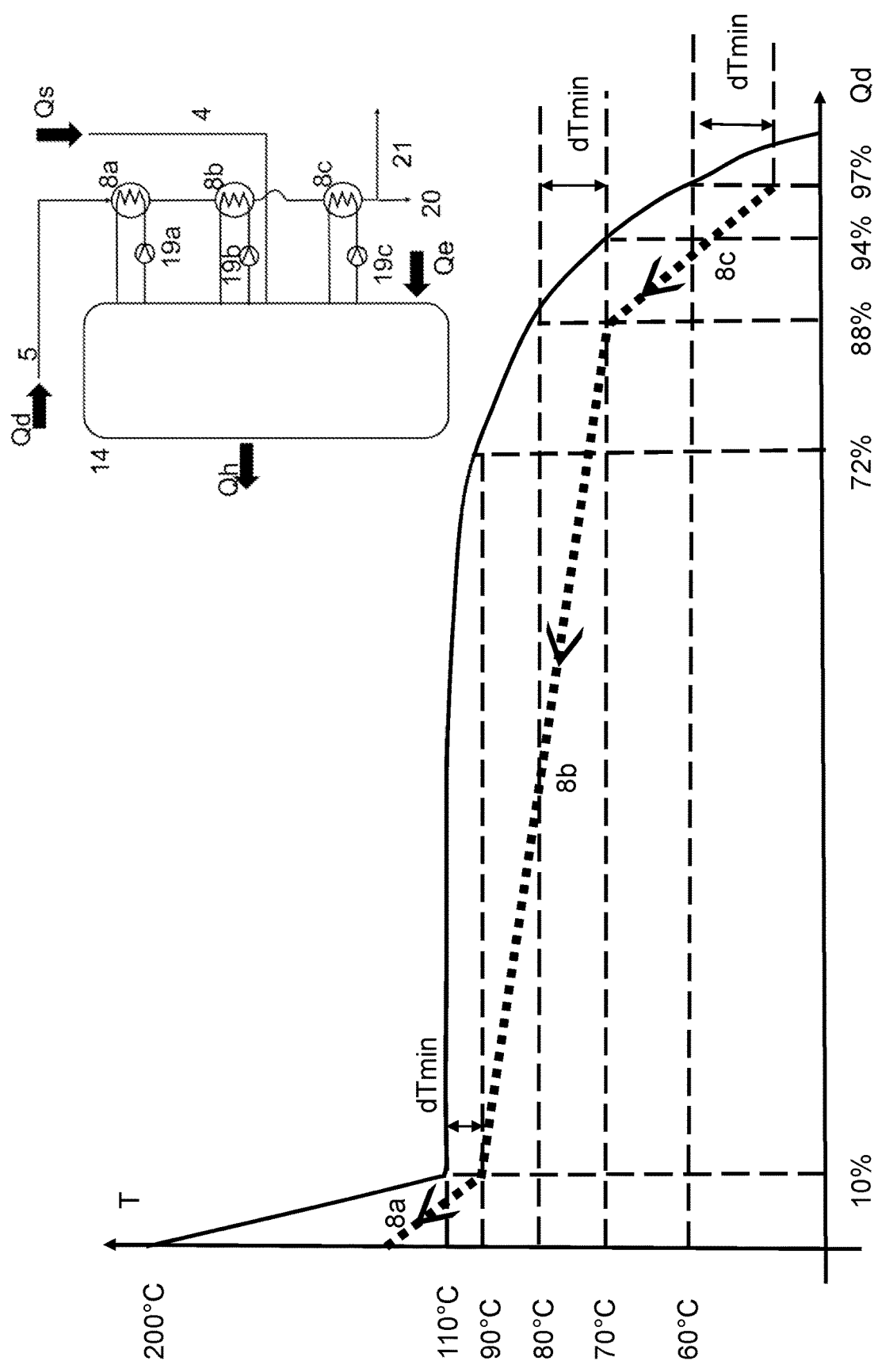
FIG. 7 shows an example of a condensation curve of a mixture of CO2 and water vapour at 1.4 bar (a) and associated recoverable sensible and latent heat Qd.

One embodiment of the device is shown in FIG. 3 where the storage device 14 is a stratified tank with a temperature range of 30-180° C., preferably 40-150° C., which can possess an internal primary condenser 8 as well as a vaporizer 25 along with a multitude of extraction points presented in FIG. 2 for the extraction of $Q_h$ and at least one port for return heat transfer fluid complemented with a mechanical fluid distributor 18 such as a diffusor or a series mechanical lids which prevent mixing of the return heat transfer fluid with the fluid in the tank. The primary condenser 8 receives the desorption gases being a mixture of inert and condensable species like $CO_2$ and $H_2O$ in the ratios of 1:0.01-1:50 at pressures of 300-1800 mbar (a) preferably 400-1400 mbar (abs) and temperatures between 100 and 200° C. passing said gases in a downward direction through the tubing of said condenser and thusly through the various temperature zones within the stratified tank. The condensable species undergo condensation at a specific temperature dictated by the local gas composition and the saturation conditions and thereby transfer sensible and latent heat $Q_d$ to the heat transfer fluid within the stratified tank. The product gas 20a leaves with condensate 21 being extracted at the separator 26. Further, liquid feed water 22 can lead into the vaporizer passing upwards through the various temperature zones of said stratified tank hereby gaining energy from the heat transfer fluid within the tank and eventually forming steam to exit the system as water vapor 9 to be supplied to the consumer or the units are purging gas. As with other condensable species in the desorption gases 5, the latent heat of water vapor 9 which has passed through units as purge gas can be also recovered and reused with the described method, thereby dramatically reducing the net energy requirement. Preferably, condensate flow 21 and liquid water feed 22 can be coupled as shown with a pump through a separator 26. A number of—but not limited to—options for supplying $Q_e$ may be an electrical heater 24 in the feed heat transfer fluid line or as shown installed in the tank. Yet a further option may be an interface heat exchanger 28 integrated into the storage tank for coupling with an external heat supply 23 with a circulation pump 19. The primary condenser 8 and vaporizer 25 span at least a part, but not necessarily the same part of the temperature range of the stratified tank. The elegancy of a condenser and vaporizer internal to the stratified tank is that sensible and latent heat $Q_d$ recovery as well as vapor production take place at exactly the right temperatures dictated only by the saturation conditions of the respective media without the need for external circulation, repartitioning of heat transfer fluid or process control The primary condenser 8 may have more than one extraction point as shown by the product gas flow 20b which may be extracted at a temperature which can be higher than the lowest in the stratified tank 14 thereby delivering a specific water content or $CO_2$:$H_2O$ content respectively selected to match downstream applications such as material or fuel synthesis. In another embodiment, at least one condenser 8 can be external to the tank with supplementary circulation circuits extracting heat transfer fluid from the stratified tank at specific temperatures to realize the recovery of $Q_d$ as shown in FIG. 7. The operation of such an embodiment is discussed in detail in Example 4 given below. If multiple tanks are used for the thermal storage device, condenser 8 and vaporizer 25 can traverse more than one tank dependent on the temperature levels of the tanks. The volume of a stratified tank can be related to the duration of the process steps (b) and (c) and the number of units simultaneously undergoing these steps and should lie between 3 and 10 m3/unit preferably 7 to 10 m3/unit.

As will be shown in detail in Examples 1-5, the energetically and economically feasible operation of the disclosed desorption process hinges on the recovery of both sensible heat $Q_s$ and the latent and sensible heat of desorption gases $Q_d$ in combination with a thermal storage device 14.

Firstly, only both forms of energy recovery can cover the complete temperature range of heat required for desorption. Secondly, the recovery of $Q_s$ represents at most ⅓-¼ of the total heat required for desorption and can be—in particular with high flows of purge vapor 9 as required for certain sorbent materials—as low as ½₀. Without the recovery of $Q_d$—in particular with high flows of purge vapor 9—the desorption process would need a prohibitively high supply of external energy $Q_e$. Thirdly, due to the nature of a transient heating process, the various phases of desorption occur sequentially with increasing temperature with first a pure sensible heating process from ambient conditions to ca. 60° C., then the release of desorbate species like $CO_2$ and $H_2O$ followed typically by the application of a purging vapor flow. Each of these process phases can only be supplied with previously recovered heat if this heat can be stored between the desorptions of individual units. Although an external heat supply is always required for the desorption process, utilizing both recoverable heat flows $Q_s$ and $Q_d$ with a storage device allows such an external heat supply to have a much smaller capacity than a system which would need to accommodate the strongly fluctuating thermal load of a transient heating and desorption process. This consequently reduces significantly equipment costs but is only feasible with a storage device.

Finally, the fundamental adsorption/desorption process as described above requires both the cooling of a unit from a desorption temperature to ambient atmospheric temperature—an extraction of sensible heat Qs—some form of compression of desorption gases from vacuum conditions to at least atmospheric conditions such that the product gas can be transferred to the downstream consumer and the extraction of at least a portion of water from the product gas flow—extraction of Qd. As such, the heat flows of Qs and Qd are both intrinsically present in the described process and are simply buffered and utilized for improved energy effiiency with the application of a thermal storage device and the herein disclosed method and device.

Example 1: Reduction of the Thermal Energy Demand for a Desorption Process Making Use of Recovered Sensible Heat Qs and Latent and Sensible Heat Qd of a Desorption Gas Mixture of CO2 and H2O Table 1 shows the assumptions used for determining the thermal energy demand for desorption process of a single DAC CO2 capture module as well as the external heat demand for process variants.

TABLE 1

Energy demand for a DAC CO2 capture process.

Assumptions for nominal case of adsorption/desorption cycle

| | |
|---|---|
| Total H2O/CO2 output | 19 kg/21 kg |
| | (Molar: 2.2:1 H2O:CO2) |
| Steam input | 20 kg |
| Thermal mass of unit | 1536 kJ/K |
| Adsorption temperature | 10° C. |
| Desorption temperature | 110° C. |

External heat demand for desorption Qe

| Without energy recovery | With sensible heat recovery of the unit (from previous cycle). | With sensible heat recovery of the unit and latent and sensible heat recovery of desorption gas. |
|---|---|---|
| 70.0 kWh | 42.6 kWh | 17.6 kWh |
| 3334 kWh/ton CO2 | 2245 kWh/ton CO2 | 838 kWh/ton CO2 |

There is clearly a very large energy benefit associated with the herein disclosed recovery methods wherein ca. 2500 kWh/ton CO2 external heating energy can be saved. Considering a typical market cost of CO2 of 300 $US/ton, and a typical external heat price of 20$US/MWh, the presented energy savings are 50 $US/ton CO2 which is a very important cost saving for the CO2 capture process.

Table 2 shows the total heat required for the above desorption process as a function of temperature level. It is seen that the majority of heat is required below 80° C. being mainly associated with sensible heating of the unit and purge steam production with the energy above 90° C. mainly serving to desorb CO2.

TABLE 2

Heat demand over six temperature levels for a DAC CO2 capture process.

| Temperature | Total heat for desorption (kWh/ton CO2) |
|---|---|
| >110° C. | 0 |
| 90-110° C. | 654 |

TABLE 2-continued

Heat demand over six temperature levels for a DAC CO2 capture process.

| Temperature | Total heat for desorption (kWh/ton CO2) |
|---|---|
| 80-90° C. | 0 |
| 65-80° C. | 1538 |
| 50-65° C. | 548 |
| 20-50° C. | 593 |
| Total | 3334 |

Example 2: Direct Recovery of Sensible Heat Qs from Heating/Cooling Units

Figure 4:
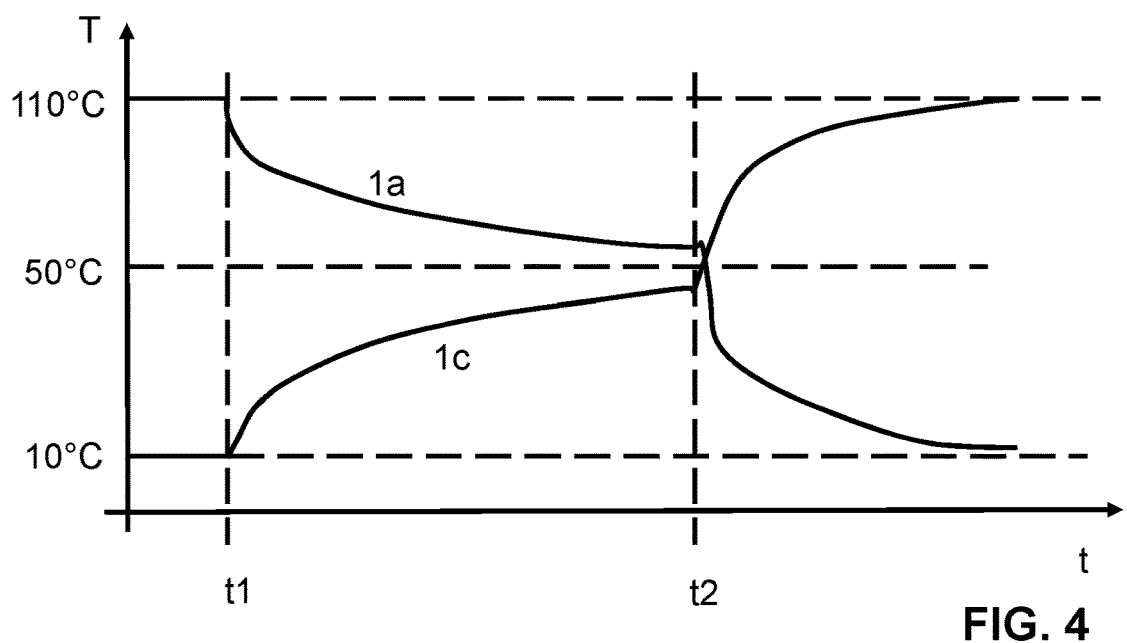
FIG. 4 shows an example of temperature profiles of two units engaging in direct sensible heat recovery.

This example refers to the embodiment of FIG. 2 with two sequentially operating units. For the purpose of this example one unit 1a has completed desorption and is hot and the other unit 1c is cold and is to start heating. The units are directly coupled and heat transfer fluid is circulated by pump 19a. FIG. 4 shows the temperatures of the units 1a and 1c. For this example, unit 1a is to be cooled from 110° C. to 10° C. while unit 1c is to be heated to 110° C. from 10° C. At time t1, the exchange of Qs is started directly between the two units by pumping heat transfer fluid between them leading to an asymptotic approach to an intermediate temperature. As the energy demand per degree of a unit undergoing heating and desorption is higher than the sensible energy supply per degree of the unit undergoing cooling, the intermediate temperature will lay closer to the starting temperature of the unit being heated. With a final desorption temperature as in Example 1 of 110° C. and an adsorption temperature of 10° C., the intermediate temperature reached at time t2 during direct sensible heat exchange will be for example 50° C. Thereafter, the unit 1c undergoes heating by means of supplementary heat delivery to the final temperature of 110° C. and unit 1a undergoes further cooling to the final temperature of 10° C. Based on the thermal mass of the unit of 1536 kJ/K, this implementation allows for recovery of 1088 kWh/ton CO2 of sensible heat Qs from unit 1a.

Example 3: Recovery of Sensible Heat Qs of a Unit During Heating and Cooling by Means of a Stratified Tank and Staged Processes This example shows the potential associated with heating and cooling by means of a stratified tank with multiple extraction point as in FIG. 2. FIG. 5a shows the heating profile of a unit supplied with a constant feed heat transfer fluid 3 temperature of 110° C. The unit 1 temperature rises with a decreasing exponential. However the return heat transfer fluid 4 temperature is significantly reduced against the feed 3 which leads to strong loss of exergy of the heat transfer fluid owing to the large temperature difference between the feed heat transfer fluid 3 and the unit 1 at the start of the heating process. FIG. 5b shows the effect of staged heating multiple temperature levels of feed heat transfer fluid 3 in which the return temperature of the heat transfer fluid 4 is closer to the feed heat transfer fluid 1 which maintains the exergy of the heat transfer fluid. Initially, a feed heat transfer fluid 3 temperature is selected for example 10° C. higher than the temperature of the unit 1. Once the rate of temperature increase of the unit 1 has slowed due to a reduced temperature difference to the feed heat transfer fluid 3, the next higher temperature level is selected as the feed until the final temperature level is reached. In such a manner valuable and generally more expensive high temperature heat is less downgraded.

Figure 5:
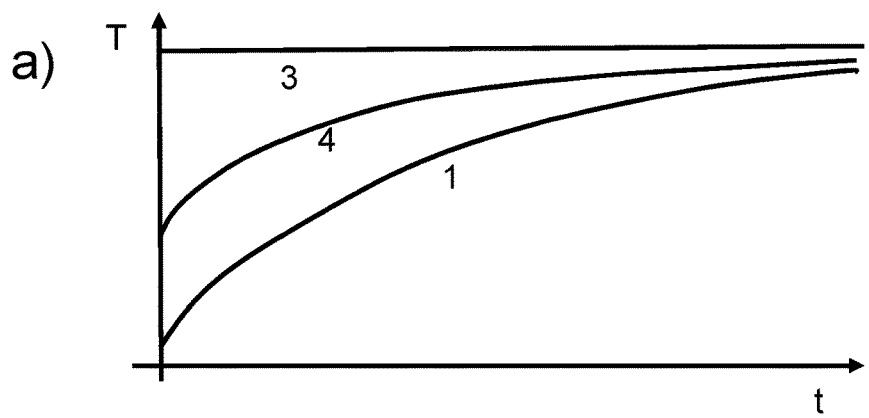
FIG. 5a & b shows examples of heating profiles arising from single temperature and multiple temperature level feed heat transfer fluid delivered to a unit.
Figure 5:
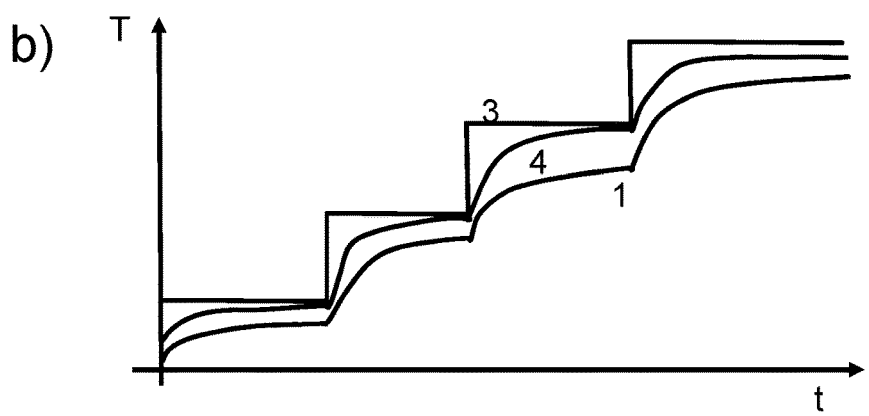
Figure 6:
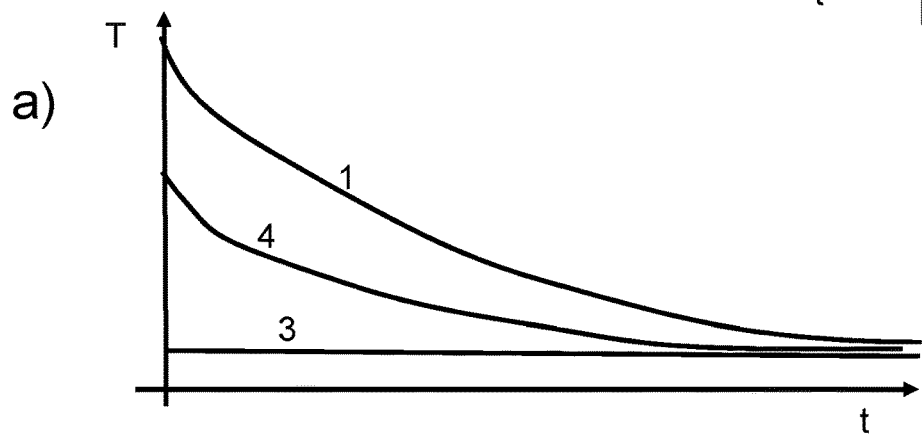
FIG. 6a & b shows examples of cooling profiles arising from single temperature and multiple temperature level feed heat transfer fluid delivered to a unit.
Figure 6:
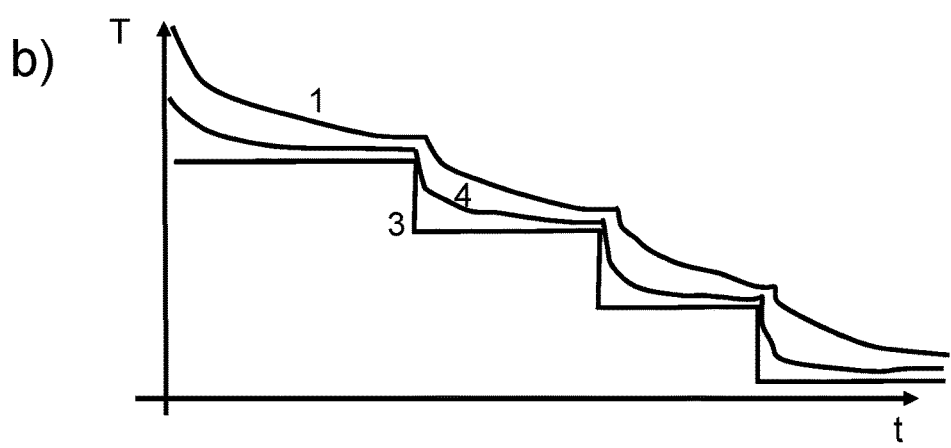

Similarly FIG. 6a shows the effects of cooling with and without a stratified tank as in FIG. 5. The unit 1 is cooled with feed heat transfer fluid 3 leading to a cooling profile of the unit along a decreasing exponential. The initially large difference between the unit temperature 1 and the cold feed heat transfer fluid 3 produces a low return heat transfer fluid temperature of 60° C. As was shown in Example 1, only a small portion of the heat demand can be covered by heat below 60° C. Further to allow effective cooling of the unit the return heat transfer fluid 4 must be additionally cooled—for example with an air cooler—and thusly the high temperature exergy of the unit is lost. FIG. 6b shows the impact of applying staged cooling from a stratified tank with multiple extraction points. Initially, the unit can be first cooled with a feed heat transfer fluid 3 for example 10° C. colder producing a return flow which has maintained the majority of its exergy and can be fed back into the stratified tank. Once the cooling rate has slowed due to a reduction in temperature difference between feed heat transfer fluid 3 and the unit 1, the next lower temperature level is selected from the stratified tank for the feed heat transfer medium 3. In this manner, large portions of the sensible heat of the unit can be recovered at temperatures which are suitable for application to a subsequent heating process.

For the desorption process of Example 1, a heat balance can be calculated for a stratified tank operating with one unit. For the purpose of this calculation, the stratified tank is discretized into 6 temperature levels as shown in Table 3. It is seen that above 90° C. no heat is recovered as the maximum temperature of cold feed heat transfer fluid is assumed to be 80° C., producing a 90° C. return. Heat at these temperature levels can however still be reused for desorption of further units. Operating with a single feed cooling temperature would yield the same total recovered heat but entirely below 60° C. and as such more than 500 kWh/ton $CO_2$ of heat are retained at attractive temperature levels.

TABLE 3

Recovered sensible heat a single desorption unit being cooled in a staged manner.

| Temperature | Sensible heat recovered (kWh/ton $CO_2$) |
|---|---|
| >110° C. | 0 |
| 90-110° C. | 0 |
| 80-90° C. | 265 |
| 65-80° C. | 288 |
| 50-65° C. | 203 |
| 20-50° C. | 367 |
| Total | 1124 |

Example 4: Recovery of Sensible and Latent Heat Qd from a Mixture of H2O and CO2 Gases Using a Stratified Tank and a Single Compression Stage This example illustrates the potential of an embodiment of FIG. 2 comprising three condensers external to a stratified tank fed with heat transfer fluid from a single storage tank 14. FIG. 7 shows the herein discussed embodiment and the condensation curve of a mixture of a H2O and CO2 with molar ratio of 3:1 being cooled downstream of the primary compression device from 200° C. to 20° C. at a total pressure of 1400 mbar (a). The initial temperature reduction from 200° C.-110° C. is coupled with a proportionally small recoverable energy amount (10%) as only sensible heat of the gases can be recovered. Once condensation begins at 110° C. (being the saturation temperature at 1400 mbar (a)) larger amounts of heat can recovered. Between 110° C. and 90° C. a further 62% of sensible and mainly latent heat of water can be recovered above 90° C. Between 90° C. and 80° C., a further 16% of heat can be recovered above 80° C. The final 12% of heat can be recovered below 80° C. Assuming a minimum temperature difference of dTmin over a primary condenser such as 8a,b,c the temperature profile of the heat transfer fluid in each of said condensers would follow the dotted line of FIG. 7.

Table 4 shows the recoverable heat Qd per temperature level from a mixture of CO2 and water vapor using an embodiment of FIG. 2. For the purpose of this example the tank is delimited into 6 temperature zones.

TABLE 4

Recovered sensible and latent heat of desorption Qd of a CO2 and H2O mixture.

| Temperature | Sensible and latent heat Qd recovered (kWh/ton CO2) |
|---|---|
| >110° C. | 113 |
| 90-110° C. | 920 |
| 80-90° C. | 121 |
| 65-80° C. | 83 |
| 50-65° C. | 53 |
| 20-50° C. | 82 |
| Total | 1373 |

It is seen that the majority of energy is recovered at a temperature level of 90-110° C. which corresponds to the latent heat of condensation of water vapor at a pressure of 1400 mbar (a) in mixture with CO2. The small recovered energy portion above 110° C. corresponds to the sensible heat of the gas mixture above the condensation condition. Comparing the above Table 4 with Table 1, it is seen that the recovered heat Qd can be used for desorption.

Example 5: Net Heat Balance of a Desorption Process Including Recovery of Sensible Heat of Units Qs and Sensible as Well as Latent Heat Qd of a Mixture of CO2 and H2O Comparing the results of the heat balance of Example 1, 3 & 4 and considering the embodiment of FIGS. 2 & 3, a net heat balance can be formulated for a stratified tank composed of the total heat demand for the DAC desorption process and the two sources of recoverable heat: sensible heat of units Qs and the sensible and latent heat Qd of desorption gases. For the purpose of this example, the stratified tank is again divided into 6 temperature levels. The net energy for each temperature level is determined by the heat demand of the desorption process and the heat recovered. Negative values indicate temperature levels at which external heat Qe must be provided. Positive values indicate a surplus of heat at that temperature level.

| Temperature | Net heat demand for desorption (kWh/ton $CO_2$) |
|---|---|
| >110° C. | 113 |
| 90-110° C. | 266 |
| 80-90° C. | 387 |
| 65-80° C. | −1167 |
| 50-65° C. | −293 |
| 20-50° C. | −144 |
| Total | −838 |

The table shows that above 80° C. a net surplus of heat is observed with a net deficit of heat observed at temperature levels below 80° C. This is due to the compression pressure of 1400 mbar (a) having a saturation temperature (and temperature of latent heat) of 110° C. This poses the problem of how to supply the necessary heat to the desorption process below 80° C. One option is the application of external heat sources such as those of FIG. 3. One further option is to downgrade the high temperature heat in the tank by applying temperature flows at for example 90° C. to a desorbing unit with a current temperature of 50° C. and thereby effectively redistributing heat within the tank. This carries however the penalty that the compression work which had been previously invested in upgrading the temperature level of the desorption gas to higher than 80° C. is thusly immediately lost. A potential further alternative that reduces the required compression work while better balancing the net heat demand for desorption is presented in Examples 6 and 7.

Figure 8:
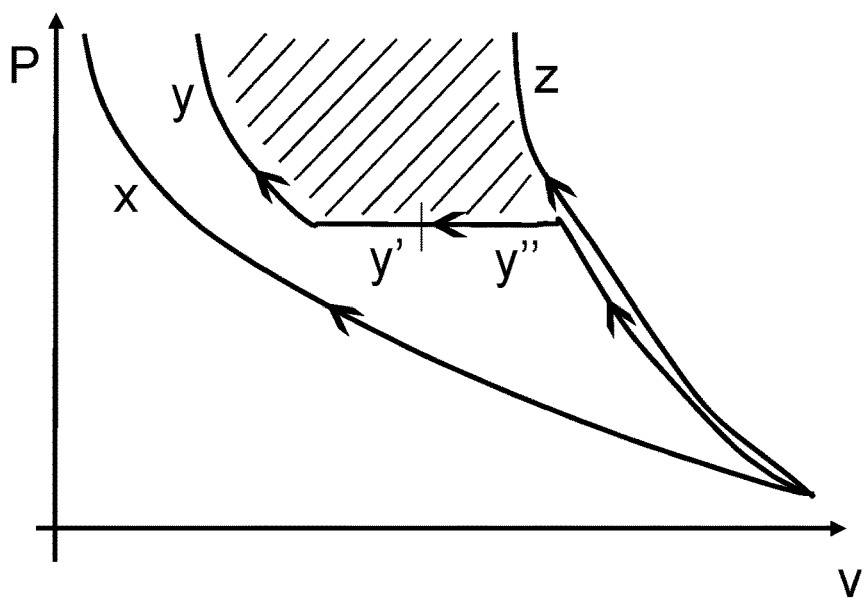
FIG. 8 show an example of a P-v curves for compression processes involving a) isothermal, b) polytropic and c) polytropic with intercooling and intercondensation compression.

Example 6: Compression Work of Single Versus Two Stage Compression with Intercooling and Vapour Condensation FIG. 8 shows idealized curves of three compression processes. Curve (x) is the ideal isothermal compression which is known to minimize compressor work. Curve (z) is the polytropic compression curve which is known to represent the majority of real compression systems. Curve (y) is the curve which can be run with two stage compression including intercooling and vapour condensation such as presented in FIG. 2. The portion y' is the volume reduction related to intercooling and the portion y" is the volume reduction from inter-condensation for example in any of the pre, post or primary condensers. Both volume reductions occur in a condenser 8 for example in a stratified tank. The resulting difference between curves (z) and (y) corresponds to the saved mechanical work for a real compressor system. Table 5 shows values for the compression work W of a desorption gas mixture of $CO_2$ and $H_2O$ stemming from the desorption process of Example 1 and shows that nearly 200 kWh work/ton $CO_2$ can be saved with a two stage compression including intercooling and inter-condensation against a single stage compression from 0.15 bar (a) to the same final pressure of 1.3 bar (a).

TABLE 5

Compression work W for a single and double stage compression of a mixture of $CO_2$ and $H_2O$ without and with intercooling and inter-condensation.

| | 1$^{st}$ stage compression work W | 2$^{nd}$ Stage compression work W | Total compression work W |
|---|---|---|---|
| Two stage compression | 150 mbar (a)- 400 mbar (a): 135 kWh/ton $CO_2$ | 400 mbar (a)- 1300 mbar (a:): 60 kWh/ton $CO_2$ | 195 kWh/ton $CO_2$ |
| Single stage compression | 150 mbar (a)- 1300 mbar (a): 395 kWh/ton $CO_2$ | | 395 kWh/ton $CO_2$ |

Example 7: Recovery of Sensible and Latent Heat of Desorption Gases Qd Using a Stratified Tank and Two Compression Stages This example addresses further advantages of a two stage compression of desorption gases and addresses the mismatch of temperature levels described in Example 5. For the purpose of this example the desorption gas 5 at 100 mbar (a), 100° C. and a molar $H_2O:CO_2$ composition of 3:1 enters the pre condenser 12 where the composition of the gas is not changed before passing the gas, to the primary compression device 7 which increases the pressure to 400 mbar (a) at a temperature of 180° C. The gas mixture enters the stratified tank 14 and proceeds through the condensation heat exchanger 8 which passes through all temperature levels of the tank. The majority of the energy will be recovered roughly at a temperature of ca. 75° C. which corresponds to saturation temperature of water vapour at 400 mbar (a). The gas exits the tank at a temperature of 20° C. in this example along with nearly all water as condensate. The composition of the process gas is now significantly reduced in $H_2O$ content compared to the state of the desorption gas 5 with a $H_2O:CO_2$ molar ratio of 0.06:1. This gas can then without further condensation enter a secondary compression device 27 which delivers product gas 20 at a pressure of 1.1 bar (a) to the consumer.

Similarly to the previous examples a heat balance can be determined for the stratified tank by discretizing it for the purpose of the calculation into six temperature levels. Important to note is that the net heat deficit for the desorption process remains substantially the same however the distribution of the heat at the individual temperature levels is better matched to the demand profile. Specifically, a much smaller deficit arises in the temperature range<80° C. than in Example 6 while there is a much lower investment in mechanical energy of compression.

| Temperature | Energy Qd recovered (kWh/ton $CO_2$) |
|---|---|
| >110° C. | 111 |
| 90-110° C. | −630 |
| 80-90° C. | 278 |
| 65-80° C. | −346 |
| 50-65° C. | −150 |
| 20-50° C. | −107 |
| Total | −838 |

Figure 9:
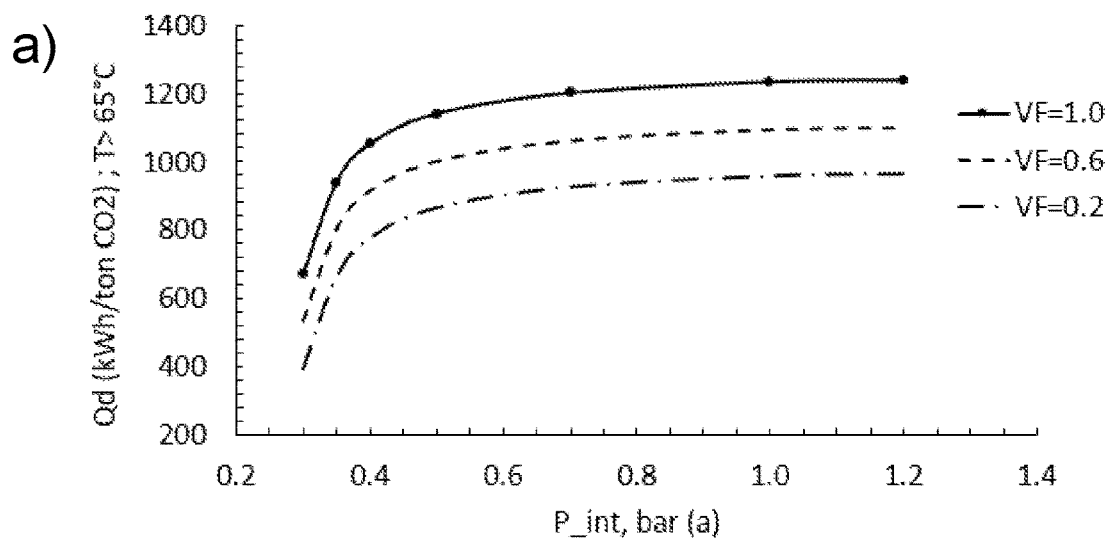
FIG. 9a & b shows in a) a curve of thermal energy recovered from the latent and sensible heat of desorption gases Qd per ton of product CO2 and in b) compressor work W per ton of product CO2 as a function of intermediate pressure level Pint and vapour fraction VF passing to the primary compression device.
Figure 9:
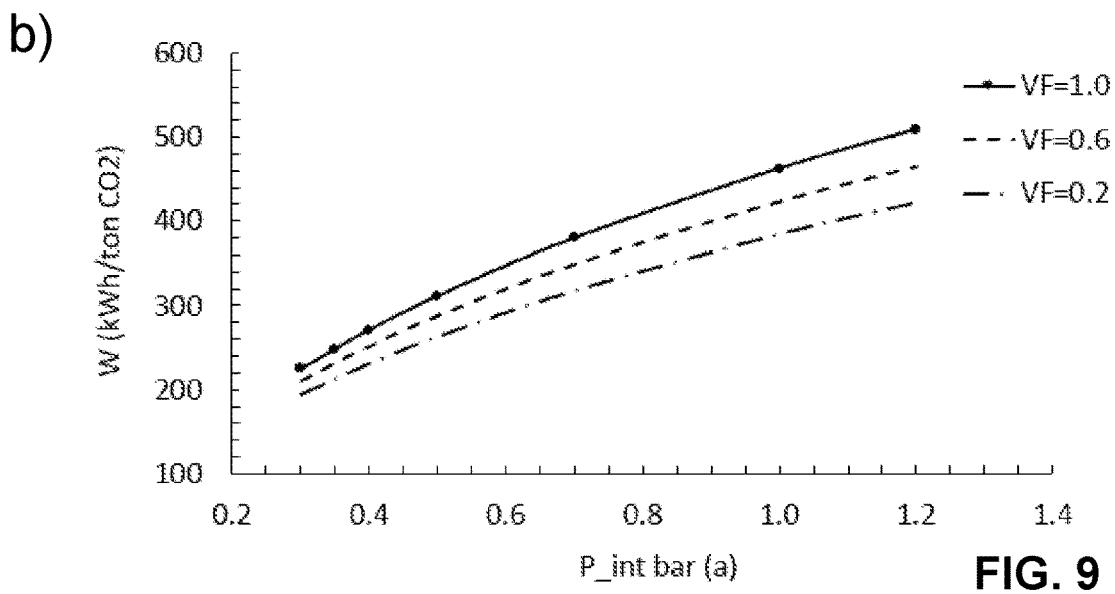

Example 8: Optimization of Recoverable Thermal Energy and Applied Mechanical Work for Compression This example and FIGS. 9a and b shows the impact of various operating conditions of the configuration shown in FIG. 2. The recoverable sensible and latent heat of desorption Qd of gases composed of $CO_2$ and $H_2O$—in this example at temperatures higher than 65° C.—as well as the invested mechanical work W for compression of said gases are shown on the y axes against the intermediate pressure Pint downstream of the primary compression device 7. The VF is the vapour fraction and represent the portion of water vapour retained in the desorption gases 5 passing through the pre condenser 12. A VF of 1 indicates no condensation and correspondingly shows the highest potential for recovery of latent and sensible energy Qd of desorption gases 5. Simultaneously however, because the gas volume flow is highest in the VF 1.0 case, the mechanical work W for compression is correspondingly highest. Decreasing VF decreases both the recoverable Qd and the mechanical work W.

Increasing Pint naturally increases the mechanical work W however also raises the saturation temperature of water vapour which allows for more recovery of Qd above 65° C. (the total potential recoverable energy down to 20° C. remains substantially constant). The strong variation in the recoverable Qd>65° C. in the range of 300 mbar (a) to ca. 500 mbar (a) is a reflection of the flat form of the condensation curve of the desorption gases at the corresponding vapour fractions (See FIG. 7) where in small variation in temperature leads to a large change in energy.

By tuning the VF with the pre condenser 12 and the intermediate compression pressure Pint an optimization of the recoverable energy Qd against the invested mechanical work of compression W can be realized for example based on site specific costs of heat and electricity as well as sorbent specific temperature levels required for desorption.

Figure 10:
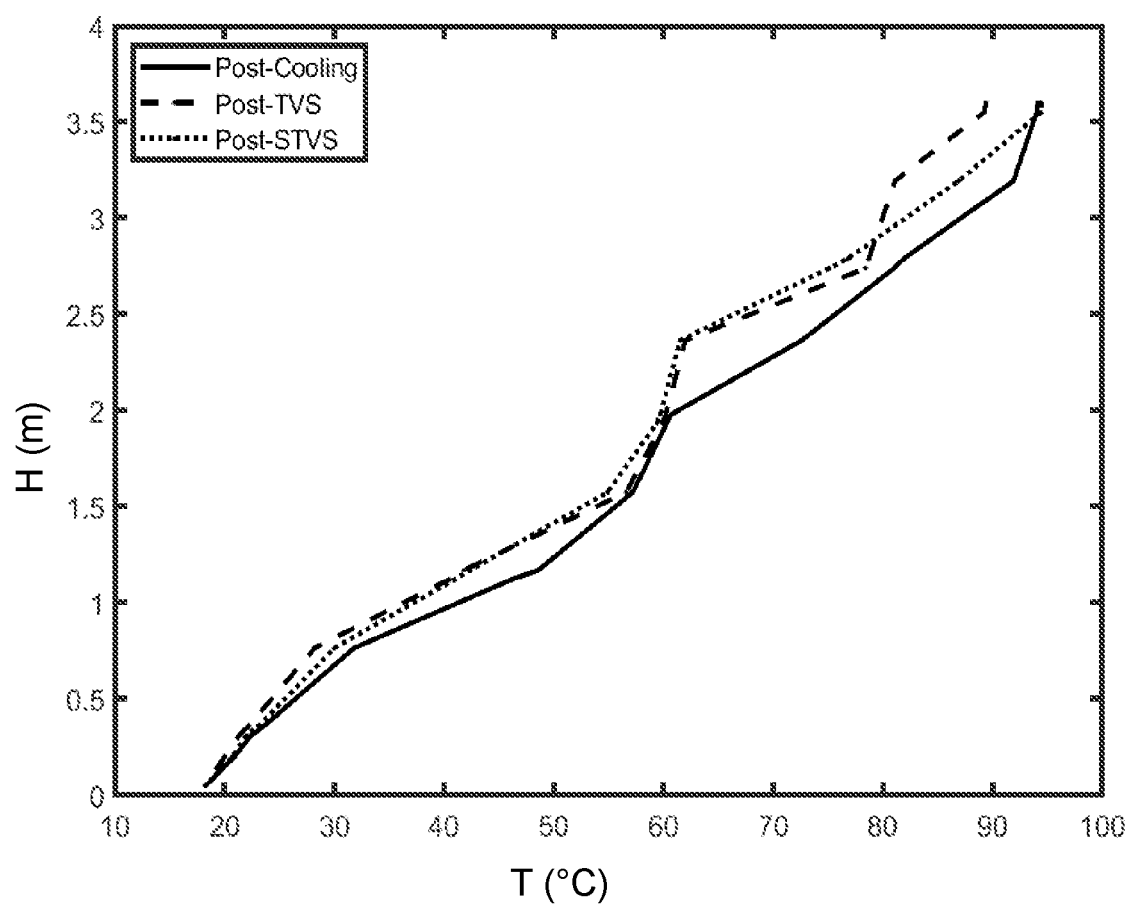
FIG. 10 shows experimental temperature profiles over the height of a possible thermal storage device at three stages of a possible adsorption/desorption process.

Example 9: Evolution of the Temperature Profile in Thermal Storage Tank During Cyclic Operation This part shows experimental data proving the function of the recovery of thermal energy during the desorption (step b) and cooling (step c) phases of a possible adsorption/desorption process and makes reference to FIG. 10, wherein temperature profiles along the height of one possible thermal storage tank according to a preferred embodiment of this invention are shown. The first profile in time is that of 'post-cooling' and corresponds to the state of the thermal storage device during process step (a).

The second profile in time is that of 'post TVS' which corresponds in this example to a portion of step (b) in which the temperature of the adsorber structure is raised, associated with the release of $CO_2$ and $H_2O$ as in a classical temperature-vacuum swing process. It is seen that the temperature at each position in the tank is reduced owning to the transfer of sensible energy as well as the energy of desorption to the adsorber structure. However, the decrease in energy is less than the total desorption energy due to the recovery of at least part of the sensible and latent heat of desorbed $CO_2$ and $H_2O$ or the procedure described in step (b-ii).

The next profile in time is that of 'post-STVS' showing the state of the thermal storage device after a further period of steam injection combined with heating and exposing the sorbent to vacuum—being at least another portion of the step (b). The profile remains largely unchanged from the 'post TVS' profile despite further heat delivery to the adsorber. This is proof of the effectiveness of the heat recovery methods of step (b-ii). In fact, the upper 0.5 m of the tank are even raised in temperature by about 10° C. due to the recovery of the latent heat of water vapour stemming from injected steam and desorbed water vapour. This recovery occurs at the highest temperature in the tank due to the recompression and subsequent condensation of said mixture and proves the effectiveness of the heat recovery concept.

Finally, the thermal storage tank will return to the 'post-cooling' profile wherein the temperature of the heat transfer fluid is raised over the entire height of the tank due to the recovery of sensible heat from the absorber structure in the step (c-i). The profile represents also the state of the thermal storage during the adsorption process of step (a) as no heat is exchanged with the adsorber structure in this step.

LIST OF REFERENCE SIGNS 1 unit containing adsorber structure
2 adsorber structure (containing heat exchanger elements)
3 feed heat transfer fluid
4 return heat transfer fluid
5 desorption gases
6 vacuum conduit
7 primary compression device
8 primary condenser for step (b)
9 steam
10 steam conduit
11 feed heat transfer line for cooling fluid
12 pre-condenser
13 post-condenser
14 thermal storage device
15 isolation valve
16 temperature measurement
17 mixing valve
18 mechanical fluid distributor
19a,b,c circulation pump
20a,b product gas, $CO_2$
21 condensate, $H_2O$
22 liquid feed
23 external heat transfer fluid connection
24 electric heater
25 vaporizer
26 condensate tank
27 secondary compression device
28 interface heat exchanger
30 air in
31 (depleted) air out
Qc cooling energy for step (c)
Qe external heating energy
Qh process heat for step (b)
Qd desorption gas sensible and latent heat from step (b)
Qs sensible heat of unit from cooling in (c)
Qpc condensation heat from pre/post condensers
T temperature
t time
W mechanical compression work
dTmin minimum temperature difference
Pint intermediate pressure
VF vapour fraction
v specific volume
x, y, z compression curves

The invention claimed is:

1. A method for separating gaseous carbon dioxide or gaseous carbon dioxide and water from a gas mixture,
   by cyclic adsorption/desorption using a sorbent material adsorbing said gaseous carbon dioxide,
   said method using at least one unit containing an adsorber structure with said sorbent material, the unit being openable to flow-through of said gas mixture and for contacting said gas mixture with the sorbent material for the adsorption step, evacuable to a vacuum pressure of 500 mbar (a) or less, and the adsorber structure located in said unit being heatable to a temperature of at least 50° C. for the desorption of at least said gaseous carbon dioxide or carbon dioxide and water vapour, wherein the method comprises the following sequential and in this sequence repeating steps:

(a) contacting said gas mixture with said sorbent material to allow at least said gaseous carbon dioxide with or without water vapour to adsorb on the sorbent material under ambient atmospheric pressure conditions in the range of 0.8 to 1.2 bar (a) in an adsorption step;

(b) at least one of: evacuating said unit to a pressure in the range of 20-400 mbar (a) and heating said sorbent material in said unit to a temperature in the range of 50-180° C. in a desorption step; and extracting at least the desorbed gaseous carbon dioxide and desorbed water vapour or desorbed gaseous carbon dioxide and water vapour originating from injected steam from the unit and separating gaseous carbon dioxide from water vapour by water condensation downstream of the unit;

(c) actively cooling the adsorber structure with said sorbent material in said unit to a temperature larger or equal to ambient atmospheric temperature and re-pressurisation of the unit to ambient atmospheric pressure conditions;

wherein (i) in step (c) at least parts of the heat released by the adsorber structure with said sorbent material in said unit during cooling is recovered and stored in a first heat storage device and used for other process steps in said unit or in at least one different but equivalent unit operated in essentially the same manner in parallel; and (ii) wherein during step (b) at least parts of at least one of the sensible and latent heat of gaseous carbon dioxide and water vapour extracted from the unit is recovered and stored in a second heat storage device and used for other process steps in said unit or in at least one different but equivalent unit operated in essentially the same manner in parallel; and (iii) wherein during step (b) at least parts of the heat required for heating said sorbent material in said unit is supplied from heat recovered in at least one of step actions (i) and (ii) of previous sequence(s) of said unit and/or of at least one different but equivalent unit operated in essentially the same manner in parallel;

wherein at least one of (i) or (ii) is implemented, as well as (iii).

2. The method according to claim 1, wherein said first and second heat storage device are one combined heat storage device, or wherein the heat required for heating said sorbent material in said unit according to step action (iii) is at least partly or fully supplied from at least one of said first and second heat storage device or from said combined heat storage device.

3. The method according to claim 2, wherein said combined heat storage device is a stratified tank, having zones of different temperature and means for extracting selectively from these zones.

4. The method according to claim 3, wherein heat is recovered during the cooling in step (c) by way of a heat exchange fluid that is returned from a heat exchanger element in the adsorber structure to the stratified tank, or wherein heat exchange fluid is extracted from the heat storage device during process steps (b) and/or (c) by sequentially opening and closing isolation valves and optionally mixing at least two of the resulting flows with the mixing valve, and wherein the temperature of the feed heat exchange fluid passed to the unit during the process step (b) is less than 40° C. higher than the temperature of the unit.

5. The method according to claim 3, wherein an external heat source is employed to further heat zones of or all of the stratified tank via an internal heat exchanger in the stratified tank and a heat exchanger in the inlet or return flow of the heat exchange fluid that is circulated between the heat exchanger element and the stratified tank.

6. The method according to claim 1, wherein a pre condenser removes at least a portion of the water vapour from the stream of steam and extracted gaseous carbon dioxide and water vapour from the unit producing an ejection stream of condensate and a flow of condensation heat ($Q_{pc}$) which can be passed to the thermal storage device, or wherein the original gaseous stream extracted from the unit or the remaining gaseous stream downstream of the pre condenser is passed to a first compressor or vacuum pump, which increases the pressure of the stream of steam or extracted gaseous carbon dioxide and water vapour from the unit from the vacuum pressure to an intermediate pressure of at least 0.3 bar (a) before passing the stream through the heat exchanger(s) inside or outside a stratified tank and thereby passing the heat of condensation of water vapour/steam as well as parts of the sensible heat of the stream directly or indirectly to the heat exchange fluid in a stratified tank, and/or wherein a post condenser removes a final portion of condensate and passes another portion of condensation heat ($Q_{pc}$) to a stratified tank and the remaining gaseous stream to a second compressor or vacuum pump downstream of the heat exchanger(s) accomplishing the final pressure increase to the delivery pressure of at least 1.0 bar (a).

7. The method according to any of the claim 1, wherein the stream of steam and/or extracted gaseous carbon dioxide and water vapour from the unit is passed in a downward flow direction through an internal heat exchanger contained within a stratified tank, whereby the heat of condensation is directly transferred to the stratified tank substantially at the level corresponding to the temperature of condensation, or wherein the sensible and/or latent heat of the water vapour that is recovered during step (b) is accepted by at least one, preheat exchanger(s), which in turn is passing said heat to a heat exchange fluid which in turn is passing the heat to a stratified tank as a storage device.

8. The method according to any of claim 1, wherein step (c) involves actively cooling the adsorber structure with said sorbent material in said unit under a pressure in the range of 20-400 mbar (a) to a temperature larger or equal to ambient atmospheric temperature and subsequent re-pressurisation of the unit to ambient atmospheric pressure conditions.

9. The method according to claim 1, wherein in step (b) steam is injected into the unit to flow-through and contact the sorbent material under saturated steam or superheated steam conditions with a superheated steam temperature of up to 180° C. at the pressure level in said unit, and wherein the molar ratio of steam that is injected during the entire step (b) to the gaseous carbon dioxide released during the entire step (b) is less than 40:1 or less than 100:1 or wherein at least parts of the heat of condensation of the injected steam is recovered and stored in a heat storage device or used for other process steps, together with the sensible and latent heats of the desorption gases extracted from the sorbent material during step (b).

10. The method according to claim 9, wherein the steam injected in step (b) is generated at least partly using heat recovered in accordance with step action (i) and/or (ii)

or wherein the steam that is injected into the unit during step (b) is at least partly produced by evaporating water flowing in an upward flow direction in an internal heat exchanger contained within the stratified tank, substantially over its entire height whereby the heat of evaporation is directly transferred from the stratified tank to the water substantially at the level corresponding to the temperature of evaporation.

11. The method according to claim 1, wherein the heat transfer to and from the adsorber structure and/or the sorbent material in said unit during steps (b) and (c) is at least partly effected by a heat exchanger element provided in the adsorber structure.

12. The method according to claim 1, wherein the heat that is recovered from the unit during cooling in step (c) is directly transferred, to a second unit containing a heat exchanger element in its adsorber structure which at this time is in step (b) and accepts the heat for heating its sorbent material, or wherein the heat that is recovered from a series of at least two units during cooling in step (c) is directly transferred via a heat exchange fluid that passes through heat exchanger elements provided in the adsorber structures of said series of units in a serial flow configuration to a second series of at least two units containing corresponding heat exchanger elements in their adsorber structures through which the heat exchange fluid also passes in a serial flow configuration.

13. The method according to claim 1, wherein at least two units are connected by two parallel sets of heat transfer circuits with independent fluid streams but connected by way of at least one common heat storage device.

14. The method according to claim 1, wherein during the at least last 5 minutes of the adsorption step (a) a heat exchange fluid is circulated through the heat exchanger element of the unit, heating the adsorber structure and the sorbent material to above ambient air temperature and consequently reducing the relative humidity of the ambient air stream in comparison to the relative humidity at the original ambient temperature of the air stream, or wherein during at least part of the adsorption step (a) a heat exchange fluid is circulated through the heat exchanger element of the adsorber structure of the unit to recover at least parts of the released heat of adsorption.

15. A device for carrying out a method according to claim 1 said device comprising at least one unit containing an adsorber structure with said sorbent material, the unit being openable to flow-through of said gas mixture and for contacting said gas mixture with the sorbent material for the adsorption step, evacuable to a vacuum pressure of 500 mbar (a) or less, and the adsorber structure located in said unit being heatable to a temperature of at least 50° C. for the desorption of at least said gaseous carbon dioxide and water vapour, wherein the device is adapted and suitable for the following sequential and in this sequence repeating steps:

(a) contacting said gas mixture with said sorbent material to allow at least said gaseous carbon dioxide with our without water vapour to adsorb on the sorbent material under ambient atmospheric pressure conditions in the range of 0.8 to 1.2 bar (a) in an adsorption step;

(b) at least one of evacuating said unit to a pressure in the range of 20-400 mbar (a) and heating said sorbent material in said unit to a temperature in the range of 50-180° C. in a desorption step and extracting at least the desorbed gaseous carbon dioxide and water vapour from the unit and separating gaseous carbon dioxide from water vapour by water condensation downstream of the unit (1);

(c) actively cooling the adsorber structure with said sorbent material in said unit to a temperature larger or equal to ambient atmospheric temperature and re-pressurisation of the unit to ambient atmospheric pressure conditions;

wherein the device further comprises (i) means for recovery in step (c) of at least parts of the heat released by the adsorber structure with said sorbent material in said unit during cooling and a first heat storage device for storing the recovered heat for use for other process steps in said unit or in at least one different but equivalent unit operated in essentially the same manner in parallel; and (ii) means for recovery during step (b) of at least parts of at least one of the sensible and latent heat of gaseous carbon dioxide and water vapour as product gases and a second heat storage device for storing the recovered heat for used for process steps in said unit or in at least one different equivalent unit operated in essentially the same manner in parallel; and (iii) wherein at least one of said first and second heat storage of said unit, and/or of at least one different but equivalent unit operated in essentially the same manner in parallel, is provided to supply during step (b) at least parts of the heat required for heating said sorbent material in said unit wherein at least one of (i) or (ii) is implemented, as well as (iii).

16. The method according claim 1, wherein said gas mixture is at least one of air, flue gas and biogas, and containing said gaseous carbon dioxide and water vapour as well as further gases different from gaseous carbon dioxide and water vapour.

17. The method according claim 1, wherein said combined heat storage device is a stratified tank, having zones of different temperature and means for extracting selectively from these zones, containing at least one phase change material and/or a heat exchange fluid, wherein said heat exchange fluid is water or a water/glycol mixture, wherein further from the same stratified tank heating liquid for step (b) and cooling liquid for step (c) is extracted from different zones thereof.

18. The method according to claim 3, wherein heat is recovered during the cooling in step (c) by way of a heat exchange fluid that is returned from a heat exchanger element in the adsorber structure to the stratified tank, wherein the heat exchange fluid that is returned from the adsorber structure is introduced into the stratified tank to a corresponding zone of the stratified tank as a function of the temperature of the heat exchange fluid that is returned from the adsorber structure and as a function of the temperature of the respective zone, wherein heat exchange fluid that is returned from the adsorber structure is introduced into a zone of the stratified tank having the same or a temperature in the range of +/−5° C. with respect to the temperature of the heat exchange fluid that is returned from the adsorber structure.

19. The method according claim 1, wherein heat exchange fluid is extracted from the heat storage device during process steps (b) and/or (c) by sequentially opening and closing isolation valves and with or without mixing at least two of the resulting flows with the mixing valve, and wherein the temperature of the feed heat exchange fluid passed to the unit during the process step (b) is less than 40° C.

20. The method according claim 1, wherein heat exchange fluid is extracted from the heat storage device during process steps (b) and/or (c) by sequentially opening and closing isolation valves and with or without mixing at least two of the resulting flows with the mixing valve, and wherein the temperature of the feed heat exchange fluid passed to the unit during the process step (b) is less than 20° C. higher than the temperature of the unit.

21. The method according claim 1, wherein heat exchange fluid is extracted from the heat storage device during process steps (b) and/or (c) by sequentially opening and closing isolation valves and with or without mixing at least two of the resulting flows with the mixing valve, and wherein the temperature of the feed heat exchange fluid passed to the unit during the process step (b) is less than 40° C. and wherein during step (c) the temperature of the feed heat exchange fluid is less than 40° C. or less than 30 or 20° C. lower than the temperature of the unit.

22. The method according to claim 1, wherein a post condenser removes a final portion of condensate and passes another portion of condensation heat (Qpc) to a stratified tank and the remaining gaseous stream to a second compressor or vacuum pump downstream of the heat exchanger(s) accomplishing the final pressure increase to the delivery pressure of at least 1.0 bar (a), and
wherein the intermediate pressure and the extraction position from the heat exchanger of water vapour and extracted gaseous carbon dioxide can be flexibly adjusted to adjust the ratio of water vapour to the non-condensable gas content in the product gas.

23. The method according claim 1, wherein the stream of steam and/or extracted gaseous carbon dioxide and water vapour from the unit is passed in a downward flow direction through an internal heat exchanger contained within a stratified tank, substantially over its entire height, whereby the heat of condensation is directly transferred to the stratified tank substantially at the level corresponding to the temperature of condensation, and wherein the stream of steam and/or extracted gaseous carbon dioxide and water vapour from the unit is compressed by a compressor or vacuum pump to a pressure of at least 0.3 bar (a), or at least 1.1 bar (a) or at least 1.4 bar (a) or at least 1.7 bar (a) prior to entering the internal heat exchanger contained within the stratified tank thereby increasing the temperature of condensation of the steam and/or water vapour
or wherein the sensible and/or latent heat of the water vapour that is recovered during step (b) is accepted by a series connection of more than one, heat exchanger(s), which in turn are passing said heat to a heat exchange fluid which in turn is passing the heat to a stratified tank as a storage device and wherein the stream of steam and/or extracted gaseous carbon dioxide and water vapour from the unit is compressed by a compressor or vacuum pump to a pressure of at least 0.3 bar (a), or at least 1.1 bar (a) or at least 1.4 bar (a) or at least 1.7 bar (a) prior to entering the at least one heat exchanger thereby increasing the temperature of condensation of the steam and/or water vapour.

24. The method according claim 1, wherein in step (b) steam is injected into the unit to flow-through and contact the sorbent material under saturated steam or superheated steam conditions with a superheated steam temperature of up to 180° C. at the pressure level in said unit, and wherein the molar ratio of steam that is injected during the entire step (b) to the gaseous carbon dioxide released during the entire step (b) is less than 100:1
or wherein at least parts of the heat of condensation of the injected steam is recovered and stored in a heat storage device or used for other process steps, together with the sensible and latent heats of the desorption gases extracted from the sorbent material during step (b), in the same heat storage device as the storage defined in step action (i) and/or (ii), in the form of a stratified tank.

25. The method according to claim 9, wherein the steam injected in step (b) is generated at least partly using heat recovered in accordance with step action (i) and/or (ii), wherein the steam is produced at least partly with heat from the heat storage device, in the form of a stratified tank,
wherein the steam that is injected into the unit during step (b) is at least partly produced by evaporating water in a heat exchanger embedded in the heat exchange fluid of the stratified tank between a temperature level of a least 30° C. and 100° C.
or wherein the steam that is injected into the unit during step (b) is at least partly produced by evaporating water flowing in an upward flow direction in an internal heat exchanger contained within the stratified tank, substantially over its entire height whereby the heat of evaporation is directly transferred from the stratified tank to the water substantially at the level corresponding to the temperature of evaporation.

26. The method according claim 1, wherein the heat transfer to and from the adsorber structure and/or the sorbent material in said unit during steps (b) and (c) is at least partly effected by a heat exchanger element provided in the adsorber structure, involving a heat exchange fluid circulated through the heat exchanger element
wherein step (b) comprises at least the following sequential steps:
(b1) preheating said sorbent material in said unit to a temperature in the range of 35-80° C., or in the range of 45-75° C., while the highest temperature of the heat exchanger element and the inlet temperature of the heat exchange fluid circulating through the heat exchanger element is below 80° C. during this preheating phase;
(b2) further heating the sorbent material in said unit to a temperature in the range of 80-180° C., preferably in the range of 90-140° C.

27. The method according claim 1, wherein the heat that is recovered from the unit during cooling in step (c) is directly transferred, via a heat exchanger element provided in the adsorber structure and a heat transfer fluid, to a second unit containing a heat exchanger element in its adsorber structure which at this time is in step (b) and accepts the heat for heating its sorbent material.

28. The device according to claim 15, wherein the adsorber structure contains an internal heat exchanger element which is flown through by a heat exchange fluid.

29. The device according to claim 15, wherein at least one unit, or a multitude of units, is connected to a stratified tank combining said first and second heat storage with split and multiple temperature levels allowing to use the low temperature zone in the range 30-60° C. for process cooling during the desorption when simultaneously heat at higher temperatures in the range 60-180° C., or 60-150° C., is being extracted for heating.

30. The device according to claim 15, wherein the sorbent material is an amine-functionalized solid adsorbent or X2CO3, wherein X is K, Na, Li or a mixture thereof.

31. The device according to claim 30, wherein the sorbent material is an amine-functionalized solid adsorbent or X2CO3, wherein X is K, Na, Li or a mixture thereof, impregnated onto a porous granular support, including active carbon.

32. The device according to claim 30, wherein the sorbent material is at least one of a weak-base ion exchange resin, amine-functionalized cellulose, amine-functionalized silica, amine-functionalized carbons, amine-functionalized metal organic frameworks, amine-functionalized polymeric adsorbents.

\* \* \* \* \*